(12) United States Patent
Ballai et al.

(10) Patent No.: US 10,469,670 B2
(45) Date of Patent: *Nov. 5, 2019

(54) METHOD AND SYSTEM FOR PREVENTING ILLICIT USE OF A TELEPHONY PLATFORM

(71) Applicant: Twilio, Inc., San Francisco, CA (US)

(72) Inventors: Adam Ballai, San Francisco, CA (US); Robert C. Hagemann, III, San Francisco, CA (US); Daniel Zarick, San Francisco, CA (US)

(73) Assignee: Twilio Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/911,737

(22) Filed: Mar. 5, 2018

(65) Prior Publication Data

US 2018/0198923 A1 Jul. 12, 2018

Related U.S. Application Data

(60) Continuation of application No. 15/440,908, filed on Feb. 23, 2017, now Pat. No. 9,948,788, which is a continuation of application No. 14/995,015, filed on Jan. 13, 2016, now Pat. No. 9,614,972, which is a continuation of application No. 14/253,316, filed on Apr. 15, 2014, now Pat. No. 9,270,833, which is a division of application No. 13/949,984, filed on Jul. 24, 2013, now Pat. No. 8,737,962.

(Continued)

(51) Int. Cl.
*H04M 15/00* (2006.01)
*H04W 12/12* (2009.01)
(Continued)

(52) U.S. Cl.
CPC ........ *H04M 15/47* (2013.01); *H04L 63/1425* (2013.01); *H04L 65/1006* (2013.01);
(Continued)

(58) Field of Classification Search
CPC .............. H04M 15/47; H04M 7/00778; H04L 65/1006; H04L 63/1425; H04L 67/22; H04W 12/12
See application file for complete search history.

(56) References Cited

U.S. PATENT DOCUMENTS 5,274,700 A 12/1993 Gechter et al.
5,526,416 A 6/1996 Dezonno et al.
(Continued)

FOREIGN PATENT DOCUMENTS

DE 1684587 A1 3/1971
EP 0282126 A2 9/1988
(Continued)

OTHER PUBLICATIONS

"API Monetization Platform", (2013).
(Continued)

*Primary Examiner* — Wayne H Cai
(74) *Attorney, Agent, or Firm* — Schwegman Lundberg & Woessner, P.A.

(57) ABSTRACT

A system and method for preventing illicit use of a telephony platform that includes enrolling a plurality of accounts on a telecommunications platform, wherein an account includes account configuration; at a fraud detection system of the telecommunications platform, receiving account usage data, wherein the usage data includes at least communication configuration data and billing configuration data of account configuration and further includes communication history of the plurality of accounts; calculating fraud scores of a set of fraud rules from the usage data, wherein at least a sub-set of the fraud rules include conditions of usage data patterns between at least two accounts; detecting when the fraud scores of an account satisfy a fraud threshold; and initiating an action response when a fraud score satisfies the fraud threshold.

20 Claims, 8 Drawing Sheets

Related U.S. Application Data

(60) Provisional application No. 61/675,156, filed on Jul. 24, 2012.

(51) Int. Cl.
    *H04L 29/06*     (2006.01)
    *H04M 7/00*     (2006.01)
    *H04L 29/08*     (2006.01)

(52) U.S. Cl.
    CPC ......... *H04M 7/0078* (2013.01); *H04W 12/12* (2013.01); *H04L 67/22* (2013.01)

(56) References Cited

U.S. PATENT DOCUMENTS

| | | | |
|---|---|---|---|
| 5,581,608 A | 12/1996 | Jreij et al. |
| 5,598,457 A | 1/1997 | Foladare et al. |
| 5,633,914 A | 5/1997 | Rosa |
| 5,867,495 A | 2/1999 | Elliott et al. |
| 5,934,181 A | 8/1999 | Adamczewski |
| 5,978,465 A | 11/1999 | Corduroy et al. |
| 6,026,440 A | 2/2000 | Shrader et al. |
| 6,034,946 A | 3/2000 | Roginsky et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,206,564 B1 | 3/2001 | Adamczewski |
| 6,223,287 B1 | 4/2001 | Douglas et al. |
| 6,232,979 B1 | 5/2001 | Shochet |
| 6,269,336 B1 | 7/2001 | Ladd et al. |
| 6,317,137 B1 | 11/2001 | Rosasco |
| 6,363,065 B1 | 3/2002 | Thornton et al. |
| 6,373,836 B1 | 4/2002 | Deryugin et al. |
| 6,425,012 B1 | 7/2002 | Trovato et al. |
| 6,426,995 B1 | 7/2002 | Kim et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,463,414 B1 | 10/2002 | Su et al. |
| 6,493,558 B1 | 12/2002 | Bernhart et al. |
| 6,496,500 B2 | 12/2002 | Nance et al. |
| 6,501,739 B1 | 12/2002 | Cohen |
| 6,501,832 B1 | 12/2002 | Saylor et al. |
| 6,507,875 B1 | 1/2003 | Mellen-Garnett et al. |
| 6,571,245 B2 | 5/2003 | Huang et al. |
| 6,574,216 B1 | 6/2003 | Farris et al. |
| 6,577,721 B1 | 6/2003 | Vainio et al. |
| 6,600,736 B1 | 7/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,636,504 B1 | 10/2003 | Albers et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,129 B1 | 3/2004 | Bauer et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,771,955 B2 | 8/2004 | Imura et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,792,093 B2 | 9/2004 | Barak et al. |
| 6,798,867 B1 | 9/2004 | Zirngibl et al. |
| 6,801,604 B2 | 10/2004 | Maes et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,820,260 B1 | 11/2004 | Flockhart et al. |
| 6,829,334 B1 | 12/2004 | Zirngibl et al. |
| 6,831,966 B1 | 12/2004 | Tegan et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,870,830 B1 | 3/2005 | Schuster et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,892,064 B2 | 5/2005 | Qi et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,928,469 B1 | 8/2005 | Duursma et al. |
| 6,931,405 B2 | 8/2005 | El-shimi et al. |
| 6,934,858 B2 | 8/2005 | Woodhill |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,947,727 B1 | 9/2005 | Brynielsson |
| 6,947,988 B1 | 9/2005 | Saleh et al. |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,985,862 B2 | 1/2006 | Strom et al. |
| 6,993,658 B1 | 1/2006 | Engberg et al. |
| 6,999,576 B2 | 2/2006 | Sacra |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,062,709 B2 | 6/2006 | Cheung |
| 7,065,637 B1 | 6/2006 | Nanja |
| 7,076,037 B1 | 7/2006 | Gonen et al. |
| 7,076,428 B2 | 7/2006 | Anastasakos et al. |
| 7,080,049 B2 | 7/2006 | Truitt et al. |
| 7,085,727 B2 | 8/2006 | Vanorman |
| 7,089,310 B1 | 8/2006 | Ellerman et al. |
| 7,092,370 B2 | 8/2006 | Jiang et al. |
| 7,103,003 B2 | 9/2006 | Brueckheimer et al. |
| 7,103,171 B1 | 9/2006 | Annadata et al. |
| 7,106,844 B1 | 9/2006 | Holland |
| 7,110,513 B2 | 9/2006 | Halpern et al. |
| 7,110,514 B2 | 9/2006 | Brown et al. |
| 7,111,163 B1 | 9/2006 | Haney |
| 7,136,932 B1 | 11/2006 | Schneider |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| 7,225,232 B2 | 5/2007 | Elberse |
| 7,227,849 B1 | 6/2007 | Rasanen |
| 7,260,208 B2 | 8/2007 | Cavalcanti |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 | 11/2007 | Mo et al. |
| 7,298,732 B2 | 11/2007 | Cho |
| 7,298,834 B1 | 11/2007 | Homeier et al. |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |

(56) References Cited

U.S. PATENT DOCUMENTS

| | | |
|---|---|---|
| 7,328,263 B1 | 2/2008 | Sadjadi |
| 7,330,463 B1 | 2/2008 | Bradd et al. |
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |
| 7,370,329 B2 | 5/2008 | Kumar et al. |
| 7,373,660 B1 | 5/2008 | Guichard et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,383,572 B2 | 6/2008 | Rolfe |
| 7,395,050 B2 | 7/2008 | Tuomi et al. |
| 7,412,525 B2 | 8/2008 | Cafarella et al. |
| 7,418,090 B2 | 8/2008 | Reding et al. |
| 7,428,302 B2 | 9/2008 | Zirngibl et al. |
| 7,431,202 B1 | 10/2008 | Meador et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,496,188 B2 | 2/2009 | Saha et al. |
| 7,496,651 B1 | 2/2009 | Joshi |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,552,054 B1 | 6/2009 | Stifelman et al. |
| 7,565,547 B2 | 7/2009 | Matta et al. |
| 7,571,226 B1 | 8/2009 | Partovi et al. |
| 7,577,847 B2 | 8/2009 | Nguyen et al. |
| 7,606,868 B1 | 10/2009 | Le et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,275 B2 | 3/2010 | Yajnik et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,685,298 B2 | 3/2010 | Day et al. |
| 7,715,547 B2 | 5/2010 | Ibbotson et al. |
| 7,716,293 B2 | 5/2010 | Kasuga et al. |
| 7,742,499 B1 | 6/2010 | Erskine et al. |
| 7,756,507 B2 | 7/2010 | Morper et al. |
| 7,764,955 B1 | 7/2010 | Mangal et al. |
| 7,779,065 B2 | 8/2010 | Gupta et al. |
| 7,875,836 B2 | 1/2011 | Imura et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,929,562 B2 | 4/2011 | Petrovykh |
| 7,936,867 B1 | 5/2011 | Hill et al. |
| 7,946,913 B2 | 5/2011 | Yacenda |
| 7,962,644 B1 | 6/2011 | Ezerzer et al. |
| 7,979,555 B2 | 7/2011 | Rothstein et al. |
| 7,983,404 B1 | 7/2011 | Croak et al. |
| 7,992,120 B1 | 8/2011 | Wang et al. |
| 8,023,425 B2 | 9/2011 | Raleigh |
| 8,024,567 B2 | 9/2011 | Han |
| 8,024,785 B2 | 9/2011 | Andress et al. |
| 8,045,689 B2 | 10/2011 | Provenzale et al. |
| 8,046,378 B1 | 10/2011 | Zhuge et al. |
| 8,046,823 B1 | 10/2011 | Begen et al. |
| 8,069,096 B1 | 11/2011 | Ballaro et al. |
| 8,078,483 B1 | 12/2011 | Hirose et al. |
| 8,081,744 B2 | 12/2011 | Sylvain |
| 8,081,958 B2 | 12/2011 | Soderstrom et al. |
| 8,103,725 B2 | 1/2012 | Gupta et al. |
| 8,126,128 B1 | 2/2012 | Hicks, III et al. |
| 8,126,129 B1 | 2/2012 | Mcguire |
| 8,139,730 B2 | 3/2012 | Da Palma et al. |
| 8,149,716 B2 | 4/2012 | Ramanathan et al. |
| 8,150,918 B1 | 4/2012 | Edelman et al. |
| 8,156,213 B1 | 4/2012 | Deng et al. |
| 8,165,116 B2 | 4/2012 | Ku et al. |
| 8,166,185 B2 | 4/2012 | Samuel et al. |
| 8,166,299 B2 | 4/2012 | Kemshall |
| 8,169,936 B2 | 5/2012 | Koren et al. |
| 8,175,007 B2 | 5/2012 | Jain et al. |
| 8,185,619 B1 | 5/2012 | Maiocco et al. |
| 8,196,133 B2 | 6/2012 | Kakumani et al. |
| 8,204,479 B2 | 6/2012 | Vendrow et al. |
| 8,233,611 B1 | 7/2012 | Zettner |
| 8,238,533 B2 | 8/2012 | Blackwell et al. |
| 8,243,889 B2 | 8/2012 | Taylor et al. |
| 8,249,552 B1 | 8/2012 | Gailloux et al. |
| 8,266,327 B2 | 9/2012 | Kumar et al. |
| 8,295,272 B2 | 10/2012 | Boni et al. |
| 8,302,175 B2 | 10/2012 | Thoursie et al. |
| 8,306,021 B2 | 11/2012 | Lawson et al. |
| 8,315,198 B2 | 11/2012 | Corneille et al. |
| 8,319,816 B1 | 11/2012 | Swanson et al. |
| 8,326,805 B1 | 12/2012 | Arous et al. |
| 8,346,630 B1 | 1/2013 | Mckeown |
| 8,355,394 B2 | 1/2013 | Taylor et al. |
| 8,413,247 B2 | 4/2013 | Hudis et al. |
| 8,416,923 B2 | 4/2013 | Lawson et al. |
| 8,417,817 B1 | 4/2013 | Jacobs |
| 8,429,827 B1 | 4/2013 | Wetzel |
| 8,438,315 B1 | 5/2013 | Tao et al. |
| 8,447,025 B2 | 5/2013 | Shaffer et al. |
| 8,462,670 B2 | 6/2013 | Chien |
| 8,462,920 B2 | 6/2013 | Gonen et al. |
| 8,467,502 B2 | 6/2013 | Sureka et al. |
| 8,477,926 B2 | 7/2013 | Jasper et al. |
| 8,503,639 B2 | 8/2013 | Reding et al. |
| 8,503,650 B2 | 8/2013 | Reding et al. |
| 8,509,068 B2 | 8/2013 | Begall et al. |
| 8,532,686 B2 | 9/2013 | Schmidt et al. |
| 8,542,805 B2 | 9/2013 | Agranovsky et al. |
| 8,543,665 B2 | 9/2013 | Ansari et al. |
| 8,547,962 B2 | 10/2013 | Ramachandran et al. |
| 8,565,117 B2 | 10/2013 | Hilt et al. |
| 8,572,391 B2 | 10/2013 | Golan et al. |
| 8,576,712 B2 | 11/2013 | Sabat et al. |
| 8,577,803 B2 | 11/2013 | Chatterjee et al. |
| 8,582,450 B1 | 11/2013 | Robesky |
| 8,594,626 B1 | 11/2013 | Woodson et al. |
| 8,601,136 B1 | 12/2013 | Fahlgren et al. |
| 8,611,338 B2 | 12/2013 | Lawson et al. |
| 8,613,102 B2 | 12/2013 | Nath |
| 8,649,268 B2 | 2/2014 | Lawson et al. |
| 8,656,452 B2 | 2/2014 | Li et al. |
| 8,667,056 B1 | 3/2014 | Proulx et al. |
| 8,675,493 B2 | 3/2014 | Buddhikot et al. |
| 8,694,025 B2 | 4/2014 | Dupray et al. |
| 8,695,077 B1 | 4/2014 | Gerhard et al. |
| 8,737,593 B2 | 5/2014 | Lawson et al. |
| 8,737,962 B2 | 5/2014 | Ballai et al. |
| 8,738,051 B2 | 5/2014 | Nowack et al. |
| 8,751,801 B2 | 6/2014 | Harris et al. |
| 8,755,376 B2 | 6/2014 | Lawson et al. |
| 8,767,925 B2 | 7/2014 | Sureka et al. |
| 8,781,975 B2 | 7/2014 | Bennett et al. |
| 8,806,024 B1 | 8/2014 | Toba Francis et al. |
| 8,819,133 B2 | 8/2014 | Wang |
| 8,825,746 B2 | 9/2014 | Ravichandran et al. |
| 8,837,465 B2 | 9/2014 | Lawson et al. |
| 8,838,707 B2 | 9/2014 | Lawson et al. |
| 8,855,271 B2 | 10/2014 | Brock et al. |
| 8,861,510 B1 | 10/2014 | Fritz |
| 8,879,547 B2 | 11/2014 | Maes |
| 8,938,053 B2 | 1/2015 | Cooke et al. |

(56) References Cited

U.S. PATENT DOCUMENTS

| | | |
|---|---|---|
| 8,948,356 B2 | 2/2015 | Nowack et al. |
| 8,964,726 B2 | 2/2015 | Lawson et al. |
| 8,990,610 B2 | 3/2015 | Bostick et al. |
| 9,014,664 B2 | 4/2015 | Kim et al. |
| 9,015,702 B2 | 4/2015 | Bhat |
| 9,031,223 B2 | 5/2015 | Smith et al. |
| 9,137,127 B2 | 9/2015 | Nowack et al. |
| 9,141,682 B1 | 9/2015 | Adoc, Jr. et al. |
| 9,160,696 B2 | 10/2015 | Wilsher et al. |
| 9,225,840 B2 | 12/2015 | Malatack et al. |
| 9,226,217 B2 | 12/2015 | Malatack |
| 9,306,982 B2 | 4/2016 | Lawson et al. |
| 9,307,094 B2 | 4/2016 | Nowack et al. |
| 9,344,573 B2 | 5/2016 | Wolthuis et al. |
| 9,378,337 B2 | 6/2016 | Kuhr |
| 9,456,008 B2 | 9/2016 | Lawson et al. |
| 9,628,624 B2 | 4/2017 | Wolthuis et al. |
| 9,632,875 B2 | 4/2017 | Raichstein et al. |
| 9,948,788 B2 | 4/2018 | Ballai et al. |
| 2001/0032192 A1 | 10/2001 | Putta et al. |
| 2001/0037254 A1 | 11/2001 | Glikman |
| 2001/0037264 A1 | 11/2001 | Husemann et al. |
| 2001/0038624 A1 | 11/2001 | Greenberg et al. |
| 2001/0043684 A1 | 11/2001 | Guedalia et al. |
| 2001/0051996 A1 | 12/2001 | Cooper et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0020741 A1 | 2/2002 | Sakaguchi |
| 2002/0032874 A1 | 3/2002 | Hagen et al. |
| 2002/0035539 A1 | 3/2002 | O'Connell |
| 2002/0057777 A1 | 5/2002 | Saito et al. |
| 2002/0064267 A1 | 5/2002 | Martin et al. |
| 2002/0067823 A1 | 6/2002 | Walker et al. |
| 2002/0070273 A1 | 6/2002 | Fujll |
| 2002/0077833 A1 | 6/2002 | Arons et al. |
| 2002/0126813 A1 | 9/2002 | Partovi et al. |
| 2002/0133587 A1 | 9/2002 | Ensel et al. |
| 2002/0136391 A1 | 9/2002 | Armstrong et al. |
| 2002/0138450 A1 | 9/2002 | Kremer |
| 2002/0147913 A1 | 10/2002 | Lun Yip |
| 2002/0165957 A1 | 11/2002 | Devoe et al. |
| 2002/0169988 A1 | 11/2002 | Vandergeest et al. |
| 2002/0176378 A1 | 11/2002 | Hamilton et al. |
| 2002/0176404 A1 | 11/2002 | Girard |
| 2002/0177433 A1 | 11/2002 | Bravo et al. |
| 2002/0184361 A1 | 12/2002 | Eden |
| 2002/0198941 A1 | 12/2002 | Gavrilescu et al. |
| 2003/0005136 A1 | 1/2003 | Eun |
| 2003/0006137 A1 | 1/2003 | Wei et al. |
| 2003/0012356 A1 | 1/2003 | Zino et al. |
| 2003/0014665 A1 | 1/2003 | Anderson et al. |
| 2003/0018830 A1 | 1/2003 | Chen et al. |
| 2003/0023672 A1 | 1/2003 | Vaysman |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal et al. |
| 2003/0088421 A1 | 5/2003 | Maes et al. |
| 2003/0097330 A1 | 5/2003 | Hillmer et al. |
| 2003/0097447 A1 | 5/2003 | Johnston |
| 2003/0097639 A1 | 5/2003 | Niyogi et al. |
| 2003/0103620 A1 | 6/2003 | Brown et al. |
| 2003/0123640 A1 | 7/2003 | Roelle et al. |
| 2003/0126076 A1 | 7/2003 | Kwok et al. |
| 2003/0149721 A1 | 8/2003 | Alfonso-nogueiro et al. |
| 2003/0159068 A1 | 8/2003 | Halpin et al. |
| 2003/0169881 A1 | 9/2003 | Niedermeyer |
| 2003/0172272 A1 | 9/2003 | Ehlers et al. |
| 2003/0195950 A1 | 10/2003 | Huang et al. |
| 2003/0195990 A1 | 10/2003 | Greenblat et al. |
| 2003/0196076 A1 | 10/2003 | Zabarski et al. |
| 2003/0204616 A1 | 10/2003 | Billhartz et al. |
| 2003/0204756 A1 | 10/2003 | Ransom et al. |
| 2003/0211842 A1 | 11/2003 | Kempf et al. |
| 2003/0221125 A1 | 11/2003 | Rolfe |
| 2003/0231647 A1 | 12/2003 | Petrovykh |
| 2003/0233276 A1 | 12/2003 | Pearlman et al. |
| 2004/0008635 A1 | 1/2004 | Nelson et al. |
| 2004/0011690 A1 | 1/2004 | Marfino et al. |
| 2004/0044953 A1 | 3/2004 | Watkins et al. |
| 2004/0052349 A1 | 3/2004 | Creamer et al. |
| 2004/0054632 A1 | 3/2004 | Remy |
| 2004/0071275 A1 | 4/2004 | Bowater et al. |
| 2004/0073519 A1 | 4/2004 | Fast |
| 2004/0097217 A1 | 5/2004 | Mcclain |
| 2004/0101122 A1 | 5/2004 | Da Palma et al. |
| 2004/0102182 A1 | 5/2004 | Reith et al. |
| 2004/0117788 A1 | 6/2004 | Karaoguz et al. |
| 2004/0122685 A1 | 6/2004 | Bunce |
| 2004/0136324 A1 | 7/2004 | Steinberg et al. |
| 2004/0165569 A1 | 8/2004 | Sweatman et al. |
| 2004/0172482 A1 | 9/2004 | Weissman et al. |
| 2004/0199572 A1 | 10/2004 | Hunt et al. |
| 2004/0203595 A1 | 10/2004 | Singhal |
| 2004/0205101 A1 | 10/2004 | Radhakrishnan |
| 2004/0205689 A1 | 10/2004 | Ellens et al. |
| 2004/0213400 A1 | 10/2004 | Golitsin et al. |
| 2004/0216058 A1 | 10/2004 | Chavers et al. |
| 2004/0218748 A1 | 11/2004 | Fisher |
| 2004/0219904 A1 | 11/2004 | De Petris |
| 2004/0228469 A1 | 11/2004 | Andrews et al. |
| 2004/0236696 A1 | 11/2004 | Aoki et al. |
| 2004/0240649 A1 | 12/2004 | Goel |
| 2005/0005109 A1 | 1/2005 | Castaldi et al. |
| 2005/0005200 A1 | 1/2005 | Matenda et al. |
| 2005/0010483 A1 | 1/2005 | Ling |
| 2005/0015505 A1 | 1/2005 | Kruis et al. |
| 2005/0021626 A1 | 1/2005 | Prajapat et al. |
| 2005/0025303 A1 | 2/2005 | Hostetler |
| 2005/0038772 A1 | 2/2005 | Colrain |
| 2005/0043952 A1 | 2/2005 | Sharma et al. |
| 2005/0047579 A1 | 3/2005 | Mansour |
| 2005/0060411 A1 | 3/2005 | Coulombe et al. |
| 2005/0066179 A1 | 3/2005 | Seidlein |
| 2005/0083907 A1 | 4/2005 | Fishler |
| 2005/0091336 A1 | 4/2005 | Dehamer et al. |
| 2005/0091572 A1 | 4/2005 | Gavrilescu et al. |
| 2005/0108770 A1 | 5/2005 | Karaoguz et al. |
| 2005/0125251 A1 | 6/2005 | Berger et al. |
| 2005/0125739 A1 | 6/2005 | Thompson et al. |
| 2005/0128961 A1 | 6/2005 | Miloslavsky et al. |
| 2005/0135578 A1 | 6/2005 | Ress et al. |
| 2005/0141500 A1 | 6/2005 | Bhandari et al. |
| 2005/0147088 A1 | 7/2005 | Bao et al. |
| 2005/0176449 A1 | 8/2005 | Cui et al. |
| 2005/0177635 A1 | 8/2005 | Schmidt et al. |
| 2005/0181835 A1 | 8/2005 | Lau et al. |
| 2005/0198292 A1 | 9/2005 | Duursma et al. |
| 2005/0228680 A1 | 10/2005 | Malik |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0273442 A1 | 12/2005 | Bennett et al. |
| 2005/0286496 A1 | 12/2005 | Malhotra et al. |
| 2005/0289222 A1 | 12/2005 | Sahim |
| 2006/0008065 A1 | 1/2006 | Longman et al. |
| 2006/0008073 A1 | 1/2006 | Yoshizawa et al. |
| 2006/0008256 A1 | 1/2006 | Khedouri et al. |
| 2006/0015467 A1 | 1/2006 | Morken et al. |
| 2006/0020799 A1 | 1/2006 | Kemshall |
| 2006/0021004 A1 | 1/2006 | Moran et al. |
| 2006/0023676 A1 | 2/2006 | Whitmore et al. |
| 2006/0047666 A1 | 3/2006 | Bedi et al. |
| 2006/0067506 A1 | 3/2006 | Flockhart et al. |
| 2006/0080415 A1 | 4/2006 | Tu |
| 2006/0098624 A1 | 5/2006 | Morgan et al. |
| 2006/0129638 A1 | 6/2006 | Deakin |
| 2006/0143007 A1 | 6/2006 | Koh et al. |

(56) References Cited

U.S. PATENT DOCUMENTS

| | | |
|---|---|---|
| 2006/0146792 A1 | 7/2006 | Ramachandran et al. |
| 2006/0146802 A1 | 7/2006 | Baldwin et al. |
| 2006/0168334 A1 | 7/2006 | Potti et al. |
| 2006/0203979 A1 | 9/2006 | Jennings |
| 2006/0209695 A1 | 9/2006 | Archer, Jr. et al. |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0222166 A1 | 10/2006 | Ramakrishna et al. |
| 2006/0235715 A1 | 10/2006 | Abrams et al. |
| 2006/0256816 A1 | 11/2006 | Yarlagadda et al. |
| 2006/0262915 A1 | 11/2006 | Marascio et al. |
| 2006/0270386 A1 | 11/2006 | Yu et al. |
| 2006/0285489 A1 | 12/2006 | Francisco et al. |
| 2007/0002744 A1 | 1/2007 | Mewhinney et al. |
| 2007/0027775 A1 | 2/2007 | Hwang |
| 2007/0036143 A1 | 2/2007 | Alt et al. |
| 2007/0038499 A1 | 2/2007 | Margulies et al. |
| 2007/0042755 A1 | 2/2007 | Singhal |
| 2007/0043681 A1 | 2/2007 | Morgan et al. |
| 2007/0050306 A1 | 3/2007 | McQueen |
| 2007/0064672 A1 | 3/2007 | Raghav et al. |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0088836 A1 | 4/2007 | Tai et al. |
| 2007/0091907 A1 | 4/2007 | Seshadri et al. |
| 2007/0094095 A1 | 4/2007 | Kilby |
| 2007/0107048 A1 | 5/2007 | Halls et al. |
| 2007/0112574 A1 | 5/2007 | Greene |
| 2007/0112673 A1 | 5/2007 | Protti |
| 2007/0116191 A1 | 5/2007 | Bermudez et al. |
| 2007/0121651 A1 | 5/2007 | Casey et al. |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0147351 A1 | 6/2007 | Dietrich et al. |
| 2007/0149166 A1 | 6/2007 | Turcotte et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0201448 A1 | 8/2007 | Baird et al. |
| 2007/0208862 A1 | 9/2007 | Fox et al. |
| 2007/0232284 A1 | 10/2007 | Mason et al. |
| 2007/0239761 A1 | 10/2007 | Baio et al. |
| 2007/0242626 A1 | 10/2007 | Altberg et al. |
| 2007/0255828 A1 | 11/2007 | Paradise |
| 2007/0265073 A1 | 11/2007 | Novi et al. |
| 2007/0286180 A1 | 12/2007 | Marquette et al. |
| 2007/0291734 A1 | 12/2007 | Bhatia et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0005275 A1 | 1/2008 | Overton et al. |
| 2008/0025320 A1 | 1/2008 | Bangalore et al. |
| 2008/0037715 A1 | 2/2008 | Prozeniuk et al. |
| 2008/0037746 A1 | 2/2008 | Dufrene et al. |
| 2008/0040484 A1 | 2/2008 | Yardley |
| 2008/0049617 A1 | 2/2008 | Grice et al. |
| 2008/0052395 A1 | 2/2008 | Wright et al. |
| 2008/0091843 A1 | 4/2008 | Kulkarni |
| 2008/0101571 A1* | 5/2008 | Harlow ............... H04M 3/2281 379/189 |
| 2008/0104348 A1 | 5/2008 | Kabzinski et al. |
| 2008/0120702 A1 | 5/2008 | Hokimoto |
| 2008/0123559 A1 | 5/2008 | Haviv et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling et al. |
| 2008/0162482 A1 | 7/2008 | Ahern et al. |
| 2008/0165708 A1 | 7/2008 | Moore et al. |
| 2008/0172404 A1 | 7/2008 | Cohen |
| 2008/0177883 A1 | 7/2008 | Hanai et al. |
| 2008/0192736 A1 | 8/2008 | Jabri et al. |
| 2008/0201426 A1 | 8/2008 | Darcie |
| 2008/0209050 A1 | 8/2008 | Li |
| 2008/0212945 A1 | 9/2008 | Khedouri et al. |
| 2008/0222656 A1 | 9/2008 | Lyman |
| 2008/0229421 A1 | 9/2008 | Hudis et al. |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0307436 A1 | 12/2008 | Hamilton |
| 2008/0310599 A1 | 12/2008 | Purnadi et al. |
| 2008/0313318 A1 | 12/2008 | Vermeulen et al. |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089352 A1 | 4/2009 | Davis et al. |
| 2009/0089699 A1 | 4/2009 | Saha et al. |
| 2009/0092674 A1 | 4/2009 | Ingram et al. |
| 2009/0093250 A1 | 4/2009 | Jackson et al. |
| 2009/0106829 A1 | 4/2009 | Thoursie et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0193433 A1 | 7/2009 | Maes |
| 2009/0216835 A1 | 8/2009 | Jain et al. |
| 2009/0217293 A1 | 8/2009 | Wolber et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0228868 A1 | 9/2009 | Drukman et al. |
| 2009/0232289 A1 | 9/2009 | Drucker et al. |
| 2009/0234965 A1 | 9/2009 | Viveganandhan et al. |
| 2009/0235349 A1 | 9/2009 | Lai et al. |
| 2009/0241135 A1 | 9/2009 | Wong et al. |
| 2009/0252159 A1 | 10/2009 | Lawson et al. |
| 2009/0262725 A1 | 10/2009 | Chen et al. |
| 2009/0276771 A1 | 11/2009 | Nickolov et al. |
| 2009/0288012 A1 | 11/2009 | Hertel et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1* | 12/2009 | Vasten ............... H04M 15/00 455/406 |
| 2010/0027531 A1 | 2/2010 | Kurashima |
| 2010/0037204 A1 | 2/2010 | Lin et al. |
| 2010/0054142 A1 | 3/2010 | Moiso et al. |
| 2010/0070424 A1 | 3/2010 | Monk |
| 2010/0071053 A1 | 3/2010 | Ansari et al. |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0094758 A1 | 4/2010 | Chamberlain et al. |
| 2010/0103845 A1 | 4/2010 | Ulupinar et al. |
| 2010/0107222 A1 | 4/2010 | Glasser |
| 2010/0115041 A1 | 5/2010 | Hawkins et al. |
| 2010/0138501 A1 | 6/2010 | Clinton et al. |

(56) References Cited

U.S. PATENT DOCUMENTS

| | | |
|---|---|---|
| 2010/0142516 A1 | 6/2010 | Lawson et al. |
| 2010/0150139 A1 | 6/2010 | Lawson et al. |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari et al. |
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0250946 A1 | 9/2010 | Korte et al. |
| 2010/0251329 A1 | 9/2010 | Wei |
| 2010/0251340 A1 | 9/2010 | Martin et al. |
| 2010/0265825 A1 | 10/2010 | Blair et al. |
| 2010/0281108 A1 | 11/2010 | Cohen |
| 2010/0291910 A1 | 11/2010 | Sanding et al. |
| 2010/0299437 A1 | 11/2010 | Moore |
| 2010/0312919 A1 | 12/2010 | Lee et al. |
| 2010/0332852 A1 | 12/2010 | Vembu et al. |
| 2011/0026516 A1 | 2/2011 | Roberts et al. |
| 2011/0029882 A1 | 2/2011 | Jaisinghani |
| 2011/0029981 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083069 A1 | 4/2011 | Paul et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110366 A1 | 5/2011 | Moore et al. |
| 2011/0131293 A1 | 6/2011 | Mori |
| 2011/0138453 A1 | 6/2011 | Verma et al. |
| 2011/0143714 A1 | 6/2011 | Keast et al. |
| 2011/0145049 A1 | 6/2011 | Hertel et al. |
| 2011/0149810 A1 | 6/2011 | Koren et al. |
| 2011/0149950 A1 | 6/2011 | Petit-Huguenin et al. |
| 2011/0151884 A1 | 6/2011 | Zhao |
| 2011/0158235 A1 | 6/2011 | Senga |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0211679 A1 | 9/2011 | Mezhibovsky et al. |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0258432 A1 | 10/2011 | Rao et al. |
| 2011/0265168 A1 | 10/2011 | Lucovsky et al. |
| 2011/0265172 A1 | 10/2011 | Sharma |
| 2011/0267985 A1 | 11/2011 | Wilkinson et al. |
| 2011/0274111 A1 | 11/2011 | Narasappa et al. |
| 2011/0276892 A1 | 11/2011 | Jensen-Horne et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0299672 A1 | 12/2011 | Chiu et al. |
| 2011/0310902 A1 | 12/2011 | Xu |
| 2011/0313950 A1 | 12/2011 | Nuggehalli et al. |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0023531 A1 | 1/2012 | Meuninck et al. |
| 2012/0023544 A1 | 1/2012 | Li et al. |
| 2012/0027228 A1 | 2/2012 | Rijken et al. |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0079066 A1 | 3/2012 | Li et al. |
| 2012/0083266 A1 | 4/2012 | Vanswol et al. |
| 2012/0089572 A1 | 4/2012 | Raichstein et al. |
| 2012/0094637 A1 | 4/2012 | Jeyaseelan et al. |
| 2012/0101952 A1 | 4/2012 | Raleigh et al. |
| 2012/0110564 A1 | 5/2012 | Ran et al. |
| 2012/0114112 A1 | 5/2012 | Rauschenberger et al. |
| 2012/0149404 A1 | 6/2012 | Beattie et al. |
| 2012/0166488 A1 | 6/2012 | Kaushik et al. |
| 2012/0170726 A1 | 7/2012 | Schwartz |
| 2012/0173610 A1 | 7/2012 | Bleau et al. |
| 2012/0174095 A1 | 7/2012 | Natchadalingam et al. |
| 2012/0179646 A1 | 7/2012 | Hinton et al. |
| 2012/0179907 A1 | 7/2012 | Byrd et al. |
| 2012/0180021 A1 | 7/2012 | Byrd et al. |
| 2012/0180029 A1 | 7/2012 | Hill et al. |
| 2012/0185561 A1 | 7/2012 | Klein et al. |
| 2012/0198004 A1 | 8/2012 | Watte |
| 2012/0201238 A1 | 8/2012 | Lawson et al. |
| 2012/0208495 A1 | 8/2012 | Lawson et al. |
| 2012/0221603 A1 | 8/2012 | Kothule et al. |
| 2012/0226579 A1* | 9/2012 | Ha ........................ G06Q 30/02 705/26.35 |
| 2012/0239757 A1 | 9/2012 | Firstenberg et al. |
| 2012/0240226 A1 | 9/2012 | Li |
| 2012/0246273 A1 | 9/2012 | Bornstein et al. |
| 2012/0254828 A1 | 10/2012 | Aiylam et al. |
| 2012/0266258 A1 | 10/2012 | Tuchman et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0304275 A1 | 11/2012 | Ji et al. |
| 2012/0316809 A1 | 12/2012 | Egolf et al. |
| 2012/0321058 A1 | 12/2012 | Eng et al. |
| 2012/0321070 A1 | 12/2012 | Smith et al. |
| 2013/0029629 A1 | 1/2013 | Lindholm et al. |
| 2013/0031158 A1 | 1/2013 | Salsburg |
| 2013/0031613 A1 | 1/2013 | Shanabrook et al. |
| 2013/0036476 A1 | 2/2013 | Roever et al. |
| 2013/0047232 A1 | 2/2013 | Tuchman et al. |
| 2013/0054517 A1 | 2/2013 | Beechuk et al. |
| 2013/0054684 A1 | 2/2013 | Brazier et al. |
| 2013/0058262 A1 | 3/2013 | Parreira |
| 2013/0067232 A1 | 3/2013 | Cheung et al. |
| 2013/0067448 A1 | 3/2013 | Sannidhanam et al. |
| 2013/0097298 A1 | 4/2013 | Ting et al. |
| 2013/0110658 A1 | 5/2013 | Lyman |
| 2013/0132573 A1 | 5/2013 | Lindblom |
| 2013/0139148 A1 | 5/2013 | Berg et al. |
| 2013/0156024 A1 | 6/2013 | Burg |
| 2013/0179942 A1 | 7/2013 | Caplis et al. |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2013/0268676 A1 | 10/2013 | Martins et al. |
| 2013/0325934 A1 | 12/2013 | Fausak et al. |
| 2013/0328997 A1 | 12/2013 | Desai |
| 2013/0336472 A1 | 12/2013 | Fahlgren et al. |
| 2014/0013400 A1 | 1/2014 | Warshavsky et al. |
| 2014/0045456 A1 | 2/2014 | Ballai et al. |
| 2014/0058806 A1 | 2/2014 | Guenette et al. |
| 2014/0064467 A1 | 3/2014 | Lawson et al. |
| 2014/0072115 A1 | 3/2014 | Makagon et al. |
| 2014/0101058 A1 | 4/2014 | Castel et al. |
| 2014/0101149 A1 | 4/2014 | Winters et al. |
| 2014/0105372 A1 | 4/2014 | Nowack et al. |
| 2014/0106704 A1 | 4/2014 | Cooke et al. |
| 2014/0122600 A1 | 5/2014 | Kim et al. |
| 2014/0123187 A1 | 5/2014 | Reisman |
| 2014/0126715 A1 | 5/2014 | Lum et al. |
| 2014/0129363 A1 | 5/2014 | Lorah et al. |
| 2014/0153565 A1 | 6/2014 | Lawson et al. |
| 2014/0185490 A1 | 7/2014 | Holm et al. |
| 2014/0226803 A1 | 8/2014 | Ballai et al. |
| 2014/0254600 A1 | 9/2014 | Shibata et al. |
| 2014/0258481 A1 | 9/2014 | Lundell |
| 2014/0269333 A1 | 9/2014 | Boerjesson |
| 2014/0274086 A1 | 9/2014 | Boerjesson et al. |
| 2014/0282473 A1 | 9/2014 | Saraf et al. |
| 2014/0289391 A1 | 9/2014 | Balaji et al. |
| 2014/0304054 A1 | 10/2014 | Orun et al. |
| 2014/0317640 A1 | 10/2014 | Harm et al. |

(56) References Cited

U.S. PATENT DOCUMENTS

| | | |
|---|---|---|
| 2014/0355600 A1 | 12/2014 | Lawson et al. |
| 2014/0372508 A1 | 12/2014 | Fausak et al. |
| 2014/0372509 A1 | 12/2014 | Fausak et al. |
| 2014/0372510 A1 | 12/2014 | Fausak et al. |
| 2014/0373098 A1 | 12/2014 | Fausak et al. |
| 2014/0379670 A1 | 12/2014 | Kuhr |
| 2015/0004932 A1 | 1/2015 | Kim et al. |
| 2015/0004933 A1 | 1/2015 | Kim et al. |
| 2015/0023251 A1 | 1/2015 | Giakoumelis et al. |
| 2015/0026477 A1 | 1/2015 | Malatack et al. |
| 2015/0066865 A1 | 3/2015 | Yara et al. |
| 2015/0081918 A1 | 3/2015 | Nowack et al. |
| 2015/0082378 A1 | 3/2015 | Collison |
| 2015/0100634 A1 | 4/2015 | He et al. |
| 2015/0119050 A1 | 4/2015 | Liao et al. |
| 2015/0181631 A1 | 6/2015 | Lee et al. |
| 2015/0236905 A1 | 8/2015 | Bellan et al. |
| 2015/0281294 A1 | 10/2015 | Nur et al. |
| 2015/0365480 A1 | 12/2015 | Soto et al. |
| 2015/0370788 A1 | 12/2015 | Bareket et al. |
| 2015/0381580 A1 | 12/2015 | Graham, III et al. |
| 2016/0011758 A1 | 1/2016 | Dornbush et al. |
| 2016/0028695 A1 | 1/2016 | Binder |
| 2016/0112475 A1 | 4/2016 | Lawson et al. |
| 2016/0112521 A1 | 4/2016 | Lawson et al. |
| 2016/0119291 A1 | 4/2016 | Zollinger et al. |
| 2016/0127254 A1 | 5/2016 | Kumar et al. |
| 2016/0134757 A1 | 5/2016 | Ballai et al. |
| 2016/0149956 A1 | 5/2016 | Birnbaum et al. |
| 2016/0205519 A1 | 7/2016 | Patel et al. |
| 2016/0226937 A1 | 8/2016 | Patel et al. |
| 2016/0226979 A1 | 8/2016 | Lancaster et al. |
| 2016/0234391 A1 | 8/2016 | Wolthuis et al. |
| 2016/0239770 A1 | 8/2016 | Batabyal et al. |
| 2017/0163817 A1 | 6/2017 | Ballai et al. |

FOREIGN PATENT DOCUMENTS

| | | |
|---|---|---|
| EP | 1387239 A2 | 2/2004 |
| EP | 1464418 A1 | 10/2004 |
| EP | 1522922 A2 | 4/2005 |
| EP | 1770586 A1 | 4/2007 |
| EP | 2053869 A1 | 4/2009 |
| ES | 2134107 A1 | 9/1999 |
| GB | 2362489 A | 11/2001 |
| JP | 10294788 A | 11/1998 |
| JP | 2004166000 A | 6/2004 |
| JP | 2004220118 A | 8/2004 |
| JP | 2006319914 A | 11/2006 |
| WO | WO-9732448 A1 | 9/1997 |
| WO | WO-0131483 A2 | 5/2001 |
| WO | WO-0167219 A1 | 9/2001 |
| WO | WO-0219593 A2 | 3/2002 |
| WO | WO-0235486 A1 | 5/2002 |
| WO | WO-02052879 A1 | 7/2002 |
| WO | WO-2002087804 A1 | 11/2002 |
| WO | WO-03063411 A1 | 7/2003 |
| WO | WO-2006037492 A1 | 4/2006 |
| WO | WO-2009018489 A2 | 2/2009 |
| WO | WO-2009124223 A1 | 10/2009 |
| WO | WO-2010037064 A1 | 4/2010 |
| WO | WO-2010040010 A1 | 4/2010 |
| WO | WO-2010101935 A1 | 9/2010 |
| WO | WO-2011091085 A1 | 7/2011 |

OTHER PUBLICATIONS

"U.S. Appl. No. 13/949,984, Notice of Allowance dated Feb. 19, 2014", 10 pgs.

"U.S. Appl. No. 13/949,984, Response filed Jan. 30, 2014 to Restriction Requirement dated Dec. 30, 2013", 8 pgs.

"U.S. Appl. No. 13/949,984, Restriction Requirement dated Dec. 30, 2013", 6 pgs.

"U.S. Appl. No. 14/253,316, Examiner Interview Summary dated Aug. 12, 2015", 3 pgs.

"U.S. Appl. No. 14/253,316, Non Final Office Action dated Mar. 25, 2015", 9 pgs.

"U.S. Appl. No. 14/253,316, Notice of Allowance dated Oct. 14, 2015", 8 pgs.

"U.S. Appl. No. 14/253,316, Response filed Aug. 17, 2015 to Non Final Office Action dated Mar. 25, 2015", 10 pgs.

"U.S. Appl. No. 14/995,015, Corrected Notice of Allowance dated Dec. 16, 2016", 2 pgs.

"U.S. Appl. No. 14/995,015, Examiner Interview Summary dated Sep. 7, 2016", 3 pgs.

"U.S. Appl. No. 14/995,015, Non Final Office Action dated Jun. 24, 2016", 11 pgs.

"U.S. Appl. No. 14/995,015, Notice of Allowance dated Nov. 23, 2016", 13 pgs.

"U.S. Appl. No. 14/995,015, Response filed Sep. 9, 2016 to Non Final Office Action dated Jun. 24, 2016", 12 pgs.

"U.S. Appl. No. 15/440,908, Examiner Interview Summary dated Sep. 18, 2017", 3 pgs.

"U.S. Appl. No. 15/440,908, Non Final Office Action dated Jun. 13, 2017", 19 pgs.

"U.S. Appl. No. 15/440,908, Notice of Allowance dated Oct. 16, 2017", 8 pgs.

"U.S. Appl. No. 15/440,908, Notice of Allowance dated Dec. 6, 2017", 8 pgs.

"U.S. Appl. No. 15/440,908, Preliminary Amendment filed May 17, 2017", 7 pgs.

"U.S. Appl. No. 15/440,908, Response filed Sep. 13, 2017 to Non Final Office Action dated Jun. 13, 2017", 8 pgs.

"Archive Microsoft Office 365 Email I Retain Unified Archiving", GWAVA, Inc., Montreal, Canada, [Online] Retrieved from the internet: <http://www.gwava.com/Retain/Retain_for_Office_365.php>, (2015).

"Complaint for Patent Infringement", *Telinit Technologies, LLC* v. *Twilio Inc*, (Oct. 12, 2012).

"Ethernet to Token ring Bridge", Black Box Corporation, [Online] Retrieved from the internet: <http://blackboxcanada.com/resource/files/productdetails/17044.pdf>, (Oct. 1999).

"Twilio Cloud Communications—APIs for Voice, VoIP, and Text Messaging", Twilio, [Online] Retrieved from the Internet: <http://www.twilio.com/docs/api/rest/call-feedback>.

Abu-Lebdeh, et al., "A 3GPP Evolved Packet Core-Based Architecture for QoS-Enabled Mobile Video Surveillance Applications", 2012 Third International Conference on the Network of the Future {NOF), (Nov. 21-23, 2012), 1-6.

Barakovic, S, "Survey and Challenges of QoE Management Issues in Wireless Networks", (2012), 1-29.

Berners-Lee, T., "RFC 3986: Uniform Resource Identifier (URI): Generic Syntax", The Internet Society, [Online]. Retrieved from the Internet: <URL: http://tools.ietf.org/html/rfc3986>, (Jan. 2005), 57 pgs.

Kim, et al., "In-Service Feedback QoE Framework", 2010 Third International Conference on Communication Theory. Reliability and Quality of Service, (2010), 135-138.

Matos, et al., "Quality of Experience-based Routing in Multi-Service Wireless Mesh Networks", Realizing Advanced Video Optimized Wireless Networks. IEEE, (2012), 7060-7065.

Subramanya, et al., "Digital Signatures", IEEE Potentials, (Mar./Apr. 2006), 5-8.

Tran, et al., "User to User adaptive routing based on QoE", ICNS 2011: The Seventh International Conference on Networking and Services, (2011), 170-177.

Wu, et al., "Quality Evaluation in Peer-to-Peer IPTV Services", Data Traffic and Monitoring Analysis, LNCS 7754, (2013), 302-319.

U.S. Appl. No. 13/949,984, now U.S. Pat. No. 8,737,962, filed Jul. 24, 2013, Method and System for Preventing Illicit Use of a Telephony Platform.

U.S. Appl. No. 14/253,316, now U.S. Pat. No. 9,270,833, filed Apr. 15, 2014, Method and System for Preventing Illicit Use of a Telephony Platform.

(56) References Cited

OTHER PUBLICATIONS

U.S. Appl. No. 14/995,015, now U.S. Pat. No. 9,614,972, filed Jan. 13, 2016, Method and System for Preventing Illicit Use of a Telephony Platform.
U.S. Appl. No. 15/440,908, now U.S. Pat. No. 9,948,788, filed Feb. 23, 2017, Method and System for Preventing Illicit Use of a Telephony Platform.
"ActivCard", [Online]. Retrieved from the Internet: <URL: http://www.activcard.com:80/products/client/tokens/token.pdf>, (1998), 26 pgs.
"ASB Bank selects RSA Mobile two-factor authentication for Internet security; Leading New Zealand bank to integrate RSA Mobile solution to expand business opportunities and enhance", RSA Security, M2 Presswire: Coventry [Coventry], (Jun. 23, 2003), 4 pgs.
"Authenex", [Online]. Retrieved from the Internet: <URL: http://www.authenex.com:80/isaserver/pdf/psasas.pdf>, (2003), 34 pgs.
"Aventail partners with phone-based two-factor authentication company; Aventail and SecurEnvoy join forces to offer easy-to-use authentication from mobile devices for secure, remote access", Aventail- M2 Presswire: Coventry [Coventry], (Dec. 7, 2005), 4 pgs.
"Carrierinfo-Product Guide", MapInfo Corporation, (2005), 36 pgs.
"CDyne Phone Verifier", Background_Web_Archive, (2005), 4 pgs.
"Classifying m-payments—a user-centric model", Proceedings of the Third International Conference on Mobile Business, M-Business, (2004), 11 pgs.
"CRYPTO-Tokens", 12 pgs.
"Cyber Locator", (1999), 7 pgs.
"Digipass® Go 1", Strong authentication has never been so ultra-portable and so ultr a-easy to use!, 36 pgs.
"DIMACS", DIMACS Workshop on Usable Privacy and Security Software, (Jul. 7, 2004), 5 pgs.
"Diversinet", MobiSecure, 2 pgs.
"Entrust", Entrust TruePass™ Product Portfolio, 28 pgs.
"eToken", Aladdin Knowledge Systems, [Online], Retrieved from the Internet: <URL: http://www.aladdin.com:80/etoken/products.asp>, (2005), 20 pgs.
"Fight business marauders the high-tech way", Wall, Matthew. Sunday Times; London (UK). (Sep. 18, 2005), 4 pgs.
"File History U.S. Pat. No. 8,462,920 B2", 322 pgs.
"File History U.S. Pat. No. 8,737,593", 261 pgs.
"File History U.S. Pat. No. 8,755,376 B2", 1084 pgs submitted in 6 parts due to size.
"Fone Finder", (Feb. 4, 2005), 12 pgs.
"iKey 2032", Personal USB Authentication and Encryption Token, [Online] Retrieved from the Internet: <http://www.safenet-inc.com:80/library/3/iKey_2032.pdf>, 5 pgs.
"International Numbering Plans", Background_Web_Archive, (2005), 1 pg.
"Maag Holdings Selects RSA Security to Help Protect its Real Estate Information System", (2003), 5 pgs.
"Microsoft Targets Mobile Developers with Tools and Devices", Mobile Business Advisor, (2003), 1 pg.
"Multi-Factor Authentication Employing Voice Biometrics and Existing Infrastructures", Background__Web__Archive_Authentify, (2005), 15 pgs.
"Open Service Access (OSA); Parlay X Web Services; Part 2: Third Party Call (Parlay X 2)", ETSI ES 202 391-2 V1.2.1, (Dec. 2006), 18 pgs.
"Open Service Access (OSA); Parlay X Web Services; Part 4: Short Messaging (Parlay X 2)", ETSI ES 202 391-4 V1.2.1, (Dec. 2006), 26 pgs.
"Open Service Access (OSA); Parlay X Web Services; Part 7: Account Management (Parlay X 2)", EISI ES 202 391-7 V1.2.1, (Dec. 2006), 22 pgs.
"File History U.S. Pat. No. 8,351,369", 295 pgs.
"PhoneID Fraud Prevention", Delivers real-time security intelligence and data on phone numbers around the world to enable greater assurance and security against fraudulent activity, (Jun. 15, 2015), 7 pgs.
"PhoneID Score", PhoneID Score—TeleSign REST API v1.50 documentation, (Jun. 16, 2015), 10 pgs.
"PhoneID Standard", PhoneID Standard—TeleSign REST API v1.50 documentation, (Jun. 16, 2015), 1-10.
"Q3 2002 RSA Security Earnings Conference Call—Final", (Oct. 16, 2002), 12 pgs.
"QUT Digital Repository", Enhancing the Security of Internet Applications using location: A New Model for Tamper-resistant GSM Location, 9 pgs.
"Requests", TeleSign REST API v1.51 documentation, (Nov. 3, 2015), 1 pg.
"Resources", TeleSign REST API v1.51 documentation, (Nov. 2, 2015), 2 pgs.
"Responses", TeleSign REST API v1.51 documentation, (Nov. 3, 2015), 1 pg.
"Risk factor put on hold—Security Solutions—Data Under Siege—A special advertising report", (Sep. 24, 2002), 1 pg.
"RSA launches authentication solutions", (Sep. 14, 2002), 2 pgs.
"RSA Mobile", Two-factor authentication for a mobile world, 6 pgs.
"RSA Mobile New Product Review", (2002), 1 pg.
"RSA SecurID® Authentication", A Better Value for a Better ROI, 34 pgs.
"RSA Security and iRevolution Join Forces to Offer Two-Factor Authentication for Companies Using Microsoft(R) Passport", PR Newswire; New York, (Oct. 8, 2002), 4 pgs.
"RSA Security and Nocom launch new service in Scandinavia: Flexible and secure solution for user identification", (Sep. 9, 2003), 2 pgs.
"RSA Security Announces Third Quarter Results", (Oct. 16, 2002), 10 pgs.
"RSA Security Helps Banca Popolare di Sondrio (Suisse) Differentiate Itself from the Competition", PR Newswire: New York, (Apr. 15, 2003).
"RSA Security technology helps make an innovative information management solution even more compelling to the marketplace", Maag Holdings Ltd., (2004).
"RSA Security Unveils Innovative Two-Factor Authentication Solution for the Consumer Market", PR Newswire: New York, (Sep. 4, 2002), 5 pgs.
"RSA Security uses phones as security token. (Business)", RCR Wireless News. 21.36, Academic OneFile, [Online] Retrieved from the Internet: <http://link.galegroup.com/apps/doc/A91672329/AONE?u=otta35732&sid=AONE&xid=2f576581>, (Sep. 9, 2002), 1 pg.
"RSA(R) Mobile and RSA SecurID(R) Two-Factor Authentication Products Recognized", SC Magazine, (Dec. 12, 2002), 2 pgs.
"Saintlogin", Background_Web_Archive, (2005), 3 pgs.
"score ( )—TeleSign Python SDK documentation", score (), (Jun. 16, 2015) 2 pgs.
"Scottrade Selects PassMark for Strong Mutual Authentication", PassMark, 8 pgs.
"Securenvoy", 1 pg.
"Securenvoy", Secure Email, (2004), 6 pgs.
"SecurEnvoy SecurAccess", Protecting Access from outside the perimeter, (2005), 6 pgs.
"SecurEnvoy_Whitepaper", Two Factor Authentication, (May 2005), 8 pgs.
"Siemens", System Description HiPath 3000 Version 1.2-3.0, (2002).
"Simple, secure access control for the Web", using SafeWord™ PremierAccess, (Nov. 2001), 46 pgs.
"Smart Verify | TeleSign", Smart Verify, (Nov. 3, 2015), 9 pgs.
"SMS Authentication", RSA Security Inc., (Sep. 23, 2002), 1 pg.
"Sms Verify—TeleSign", SMS Verify, (Nov. 3, 2015), 8 pgs.
"Taking security online to new level", (2005), 2 pgs.
"TeleSign's PhoneID Score Named a New Products Winner", TeleSign, (Jun. 27, 2014), 4 pgs.
"Trailblazers: RSA Security (specialises in access management tools for internal security)", (2003), 1 pg.
"Verify Registration—TeleSign REST API v1.51 documentation", Verify Registration, (Nov. 3, 2015), 7 pgs.

(56) References Cited

OTHER PUBLICATIONS

"Verisign", Unified Authentication, (Mar. 21, 2005), 196 pgs.
"Voice Verify with Call Forward Detection", TeleSign Verification APIs, 2 pgs.
"What's a Cell Phone, Anyway?", Tynan, Dan. PCWorld.com; San Francisco, (Mar. 23, 2005), 3 pgs.
"What's a Mobile Phone, anyway?", Off Camera Fun, (Jun. 2005), 1 pg.
"Wifi WatchDog", Newbury Networks, 11 pgs.
"Your Phone Number is Going to Get a Reputation Score Forbes", (Jun. 16, 2015), 4 pgs.
Bennett, Robert, "American business has to start thinking of data with the same reverence that it thinks of money!", Griffin Technologies, LLC. White Paper, (Oct. 2001), 6 pgs.
Curphey, "A Guide to Building Secure Web Applications the Open Web Application Security Project", 70 pgs.
Dow, Jones, "Q4 2002 RSA Security Earnings Conference Call—Final", (Jan. 23, 2003), 1-8 pgs.
Dow, Jones, "Security merger to boost banks", The Australian, (2005), 2 pgs.
Doyle, Eric, "RSA uses SMS to offer secure Web access anywhere", (2002), 1 pg.
Fonseca, Brian, "RSA and Entrust Target Web services security returns", Dow Jones, (Oct. 8, 2002), 2 pgs.
Forbes, Bob, "The Fifth Factor: Behavior Profiling Opens New Possibilities for Web Access Control", Data Security Management, 8 pgs.
Fred, Piper, et al., "Identities and authentication", Cyber Trust & Crime Prevention Project, (Apr. 6, 2004), 1-15.
Jamieson, Rodger, et al., "A Framework for Security, Control and Assurance of Knowledge Management Systems", School of Information Systems, Technology and Management, University of New South Wales, Sydney, Australia, Chapter 25, 29 pgs.
Jones, Dow, "Awakens to the Fact That Prevention is Better Than Cure", India Inc., (Mar. 31, 2003), 1 pg.
Jones, Dow, "Make sure you're secure", Bristol Evening Post, (Oct. 25, 2004), 2 pgs.
Jones, Dow, "Regulatory News Service (RNS)", REG-iRevolution Group Announces Partnership, (Oct. 9, 2002), 2 pgs.
Jonew, Dow, "Event Brief of Q3 2002 RSA Security Earnings Conference Call—Final", (Oct. 16, 2002), 5 pgs.
Jörg, Tacke, et al., "Two-Factor Web Authentication Via Voice", Voice.Trust AG1, (2003), 88 pgs.
Kemshall, "Two Factor Authentication", White Paper, (2005), 8 pgs.
Kotanchik, J, "Kerberos and Two-Factor Authentication", (Mar. 1994), 6 pgs.
Kumar, Bharat, et al., "Breaking into Cyberia", Business Line, Dow Jones, (Nov. 5 2003), 4 pgs.
Lebihan, Rachel, "New online banking security plan in doubt", The Australian Financial Review, Dow Jones, (Aug. 2, 2004), 2 pgs.
Lebihan, Rachel, "Still Fishing for Answer to Internet Scams", The Australian Financial Review, Dow Jones, (2004), 3 pgs.
Louise, Richardson, "RSA Security", (Dec. 1, 2003), 2 pgs.
Mallery, John, "Who Are You? You just can't trust a username/ password combo to verify user identity. It's time for two-factor", Security Technology & Design, (Nov. 1, 2005), 4 pgs.
McCue, Andy, "Networks—ISP trials security via SMS", Computing, (Sep. 12, 2002), 1 pg.
McCue, Andy, "SMS Secures Online Apps", ITWeek, Dow Jones, (Sep. 9, 2002), 2 pgs.
McCue, Andy, "United Utilities pilots SMS security software", VNUnet Newswire, Dow Jones, (Sep. 4, 2002), 2 pgs.
Messmer, Ellen, "HIPAA deadline ups healthcare anxiety", Network World, (Mar. 10, 2003), 1 pg.
Mizuno, Shintaro, et al., "Authentication Using Multiple Communication Channels", (Nov. 11, 2005), 9 pgs.
Nguyen, Thien-Loc, "National Identification Systems", 156 pgs.
Nystrom, M, "The SecurID(r) SASL Mechanism", (Apr. 2000), 11 pgs.
O'Gorman, "Comparing Passwords, Tokens, and Biometrics for User Authentication", in Proceedings: The IEEE, vol. 91, Issue 12, (Dec. 2003), 20 pgs.
O'Gorman, Lawrence, et al., "Call Center Customer Verification by Query-Directed Passwords", 15 pgs.
Parthasarathy, P R, "Resolving Webuser on the Fly", 6 pgs.
Pullar-Strecker, Tom, "Asb Shuts Out Online Fraud", (Sep. 27, 2004), 2 pgs.
Pullar-Strecker, Tom, "Auckland Security Firm Turns Heads", (May 30, 2005) 3 pgs.
Pullar-Strecker, Tom, "NZ bank adds security online", (Nov. 8, 2004), 1 pg.
Pullar-Strecker, Tom, et al., "NZ start-up plans authentication trial", (Aug. 23, 2004), 3 pgs.
Scarlet, Pruitt, "RSA secures mobile access to Web apps", 1 pg.
Wolfe, Daniel, "For PassMark, Image is Everything in Phish Foiling", American Banker. 169.43, (Mar. 4, 2004), 2 pgs.
Wright, Rob, "Paramount Protection Vendors have devised new ways to safeguard information", VARbusiness, (Oct. 28, 2002), 4 pgs.
"[Proposed] Order Granting Defendant Telesign Corporation's Motion to Dismiss", *Twilio, Inc.,* v. *Telesign Corporation,* Case No. 5:16-cv-6925-LHK, Filed Jan. 25, 2017, 2 pgs.
"Complaint for Patent Infringement—Jury Trial Demanded", *Twilio Inc.,* vs. *Telesign Corporation,* Case 3:16-cv-06925 Filed Dec. 1, 2016, 240 pgs.
"Declaration of Jesse J. Camacho in Support of Defendant Telesign Corporation's Reply to Motion to Dismiss", *Twilio, Inc.,* v. *Telesign Corporation,* Case No. 5:16-cv-6925-LHK, Filed Feb. 15, 2017, 17 pgs.
"Defendant Telesign Corporation's Notice of Motion and Motion to Dismiss; Memorandum of Points and Authorities in Support Thereof", *Twilio, Inc.,* v. *Telesign Corporation* Case No. 5:16-cv-6925-LHK, Filed Jan. 25, 2017, 32 pgs.
"Defendant Telesign Corporation's Reply in Support of Motion to Dismiss", *Twilio. Inc.,* v. *Telesign Corporation,* Case No. 5:16-cv-6925-LHK, Filed Feb. 15, 2017, 22 pgs.
"Order Granting in Part and Denying in Part Defendant's Motion to Dismiss", *Twilio, Inc.,* v. *Telesign Corporation,* Case No. 16-CV-06925-LHK, Filed Mar. 31, 2017, 58 pgs.
"Order Granting in Part Defendant's Motion to Dismiss", *Twilio, Inc.,* v. *Telesign Corporation,* Case No. 16-CV-06925-LHK, Filed Apr. 17, 2017, 54 pgs.
"Plaintiff's Opposition to Defendant's Motion to Dismiss", *Twilio Inc.,* vs. *Telesign Corporation,* Case No. 5:16-CV-06925-LHK, Filed Feb. 8, 2017, 28 pgs.
"SecurAccess Overview Video", Securenvoy—Date for Overview. swf, [Online], [Accessed Jan. 20, 2005]. Retrieved from the Internet: <URL: www.securenvoy.com/animations/Overview.swf>, 14 pgs.
"SecurAccess User Guide Video", Securenvoy—Date for UserGuide. swf, [Online]. [Accessed Sep. 30, 2004]. Retrieved from the Internet: <URL: http://www.securenvoy.com/animations/UserGuide. swf>, 17 pgs.
"SecurAccess Video", Securenvoy—Date for SecurAccess.swf, [Online]. [Accessed May 5, 2006]. Retrieved from the Internet: <URL: http://www.securenvoy.com:80/animations/SecurAccess. swf>, 8 pgs.
"Final Written Decision 35 U.S.C. § 318(a)", *Telesign Corporation* v. *Twilio Inc.,* Case IPR2017-01976, U.S. Pat. No. 8,837.465B2, (Mar. 6, 2019), 42 pgs.
"Final Written Decision 35 U.S.C. § 318(a)", *Telesign Corporation* v. *Twilio Inc.,* Case IPR2017-01977, U.S. Pat. No. 8,755,376B2, (Mar. 6, 2019), 51 pgs.
"Open Service Access (OSA); Parlay X Web Services; Part 11: Audio Call (Parlay X 2)", ETSI ES 202 391-11 V1.2.1, (Dec. 2006), 19 pgs.
"Open Service Access (OSA); Parlay X Web Services; Part 3: Call Notification (Parlay X 2)", ETSI ES 202 391-3 V1.2.1, (Dec. 2006), 23 pgs.

(56) References Cited

OTHER PUBLICATIONS

Hong, Sungjune, et al., "The semantic PARLAY for 4G network", 2nd International Conference on Mobile Technology, Applications and Systems. IEEE, (2005), 5 pgs.

* cited by examiner

| Fraud Points | Item to Track | Threshold | Time Period | Account Age |
|---|---|---|---|---|
| 25 | International calls longer than 20 minutes | > 3 concurrent | all time | all time |
| 75 | Avg. length of international call | > 60 minutes | all time | all time |
| 77 | Time from account creation to upgrade | < 24 hours | - | < 3 hours |
| 23 | Number of credit cards on account | > 3 | all time | all time |
| 32 | Credit card used across | > 3 accounts | all time | all time |
| 66 | IP address used across | > 3 accounts | all time | all time |
| 64 | High phone number prefix similarity (4+ digits) | > 20% of calls or SMS | | |
| 41 | Total Number of international calls | > 200 | all time | < 24 hours |
| 51 | All credit cards on account | > 3 CC names | all time | all time |
| 29 | IP address country != credit card country | all time | all time | all time |
| 74 | Total sales | > $200 | past 1 day | < 14 days |

FIGURE 9

METHOD AND SYSTEM FOR PREVENTING ILLICIT USE OF A TELEPHONY PLATFORM

CROSS-REFERENCE TO RELATED APPLICATIONS

This application is a continuation of U.S. patent application Ser. No. 15/440,908, filed 23 Feb. 2017, which is a continuation of U.S. patent application Ser. No. 14/995,015, filed 13 Jan. 2016, which is a continuation of U.S. patent application Ser. No. 14/253,316, filed 15 Apr. 2014, which is a divisional of U.S. patent application Ser. No. 13/949,984, filed 24 Jul. 2013, which claims the benefit of U.S. Provisional Application No. 61/675,156, filed on 24 Jul. 2012, all of which are incorporated in their entirety by this reference.

TECHNICAL FIELD

This invention relates generally to the telephony field, and more specifically to a new and useful method and system for preventing illicit use of a telephony platform in the telephony field.

BACKGROUND

Telephone fraud has long been a problem for telephony systems. With the introduction of VoIP networks and Session Initiation Protocol (SIP) trunks, the opportunities for telephony fraud is even greater. The recent development of new telephony platforms that enable a wider range of developers to create useful products also enables nefarious parties to create programs that commit telephony fraud. As one example, toll fraud has become a common problem on telephony platforms due in part to easier access to disposable telephone numbers. Other forms of telephony fraud can result in chargebacks for telephony platform providers when the telephony fraud involves stolen credit cards. Yet other forms of telephony fraud use valuable resources for improper uses that would otherwise be used for legitimate applications. Telephony fraud can be damaging to users that fall victim to the telephony frauds, to the profitability of telephony platforms, and to the performance of legitimate telephony applications. Furthermore, as developers are more frequently building on top of other infrastructure, those developers may not have access to the raw information to prevent such illicit use of their applications. Thus, there is a need in the telephony field to create a new and useful method and system for preventing illicit use of a telephony platform. This invention provides such a new and useful method and system.

BRIEF DESCRIPTION OF THE FIGURES

FIG. 9 is a table depicting a fraud rule set of an exemplary implementation of a preferred embodiment of the invention.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System for Preventing Illicit Use of a Communication Platform

Figure 1:
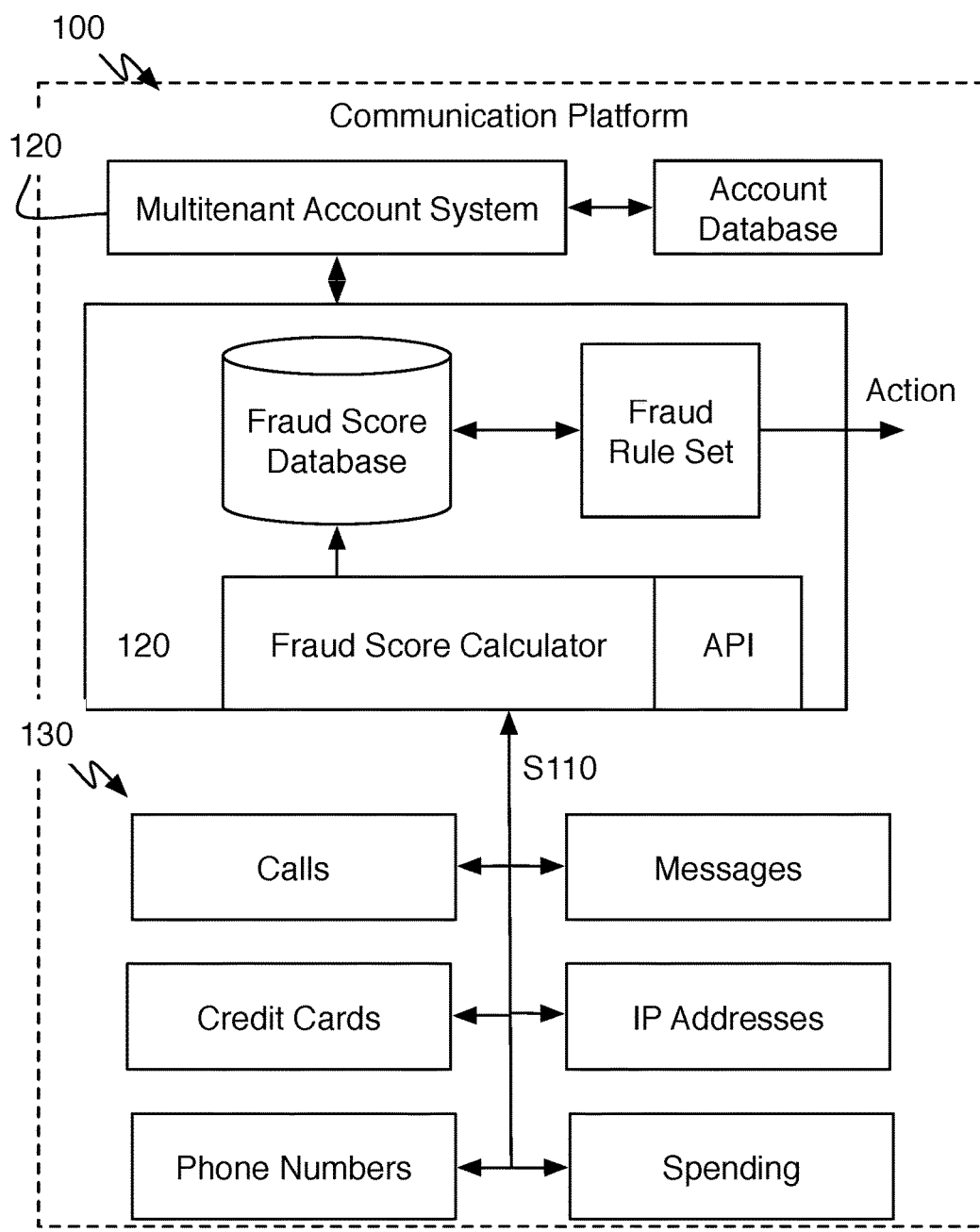
FIG. 1 is a schematic representation of a system of a preferred embodiment of the invention.

As shown in FIG. 1, a system for preventing illicit use of a communication platform of a preferred embodiment can include a communication platform 100 that includes a multitenant account system 110 and a fraud scoring system 120 communicatively coupled to operational components 130 of the communication platform. The system functions to apply various fraud-based heuristics across the accounts and/or subaccounts of the platform 100, monitor and measure the scores based on the heuristics, and alter operation of the account within the communication platform. Such a system is preferably capable of mitigating fraudulent behavior made on top of a self sign-up communication platform. In one scenario, the system can be applied to preventing illicit use within a single account. The system can additionally be extended to detect illicit use through cooperative use of multiple accounts. Another aspect is that the multitenant account system may include functionally for an account to create sub-accounts. Sub-accounts can be used so that a developer can develop a service on top of the communication platform and provide that service to end customers. The system can enable fraudulent behavior within the subaccount of an account to also be monitored for fraudulent behavior.

The communication platform 100 functions as the main infrastructure on which fraud is sought to be prevented or reduced. The communication platform is more preferably a telecommunication platform that facilitates synchronous voice communication sessions, synchronous video communication sessions, screen-sharing session, asynchronous text or media communication. In particular traditional telecommunication protocols such as telephone based networks (e.g., PSTN) or carrier based messaging (e.g., SMS or MMS) are of particular attention in the prevention of fraud. The ecosystem of traditional telecommunication protocols includes user contracts and network/carrier contracts to facilitate interoperability and functioning of the communication network as a whole. The communication platform 100 in some variations may provide a way for account holders to avoid the various contract related restrictions usually involved in using the network. For example, an account may be created and used through self sign-up, avoiding a contract lock-in or enrollment process. As described below accounts can additionally acquire and drop communication endpoints on-demand. The fraud scoring system preferably functions to ensure that such beneficial features are not leveraged in implementing toll fraud, spamming techniques, scams, or other illicit uses of the communication platform 100.

The communication platform 100 can provide any suitable service. In one variation, the communication platform 100 provides routing functionality. In another variation, the communication platform 100 may provide communication bridging between at least two protocols such as a PSTN device talking to a SIP based device. In a preferred embodiment, the communication platform 100 provides communication application functionality and/or API based integration to communication sessions, events, and resources. The communication platform preferably enables accounts to configure applications to be responsive to incoming communications. The communication platform 100 can additionally facilitate initiating outbound communications to be controlled by an application or connected to an agent. The applications are preferably internet hosted telephony instruction documents hosted externally by the developers (e.g., the account holder). The applications are preferably configured as URI mappings within an account that relate an endpoint with an application URI. The URI based applications preferably enable web developers to easily apply web-based application skills to building dynamic telephony applications. The communication application platform is preferably substantially similar to the one described in U.S. Pat. No. 8,306,021, issued 6 Nov. 2012, which is hereby incorporated in its entirety by this reference. The communication platform 100 may alternatively be focused on providing some features directed at a targeted use case. For example, the communication platform 100 may be a customer service platform used by customers to build call centers. The communication platform 100 may be a conference call service, a personal voicemail system, a notification service, a two-factor authentication facilitating service, and/or any suitable type of communication platform.

The multitenant account system 110 functions to manage and facilitate the accounts within the communication platform 100. As described above, the communication platform 100 is preferably a multitenant infrastructure in that multiple users can independently operate on shared resources of the communication platform. Preferably, any given account is prevented from impacting the resources of others within a multitenant system. The account system 110 preferably includes a user interfaced and/or programming interface (API) to create and manage an account. The communication platform will often involve paid use of communication infrastructure. The account system may include a billing engine that stores payment information of the account. Within an individual account, at least one endpoint is preferably assigned as a communication address. The communication endpoint is preferably a phone number, but may alternatively be a SIP address, a user name, or any communication address. The account system 110 or an endpoint service may additionally facilitate an account from acquiring new endpoints, porting outside endpoints for use within the platform, and/or canceling endpoints. The account system 110 can additionally manage operational configuration such as storing resources, references to resources, parameter settings, or other aspects used in account usage of the communication platform 100. Preferably, the configuration can store the application URIs mapped to endpoints of the account.

Additionally, the multitenant account system 110 can include a sub-account system such that a hierarchy of accounts can be created. A first account (i.e., a parent account) can preferably create or contain multiple sub-accounts (i.e., children accounts). Sub-accounts may be created through an interface by the sub-account holder or alternatively through an API by the parent account holder. For example, an application developer may create a customer service application, and then allow end users to signup as customers within his account. The sub-accounts will preferably operate within the scope of the parent account. The sub-accounts can be customized by the parent account and/or customized by sub-account holder. In one implementation, the sub-account system may functions similarly to the system and method described in U.S. patent application Ser. No. 13/167,569, filed 23 Jun. 2011, which is hereby incorporated in its entirety by this reference.

The fraud scoring system 120 functions to monitor, measure, and detect instances of illicit use that occur within or through the communication platform. The fraud scoring system 120 may predominantly focus on preventing continued illicit use of the communication platform 100 that is initiated by an account and/or a parent account of the communication platform 100. The fraud scoring system 120 can additionally identify and prevent illicit actions initiated by parties outside of the platform but occurring through the communication platform 100.

The fraud score preferably includes a set of fraud rules. The fraud rules are preferably conditions that either act as a metric upon which a score is based. The scores of the various fraud rules are preferably collectively analyzed to determine if fraud is occurring. A fraud rule in one variation is used in calculating a scalar measurement of one dimension or indicator of fraud. A fraud rule may alternatively be set of discrete conditions with an assigned score based on the determined condition. Preferably, this will be binary decision of assigning a fraud score or not. The fraud rules can target various aspects of communication and account usage and configuration. The fraud rules may simply evaluate indicators of fraud within an account or sub-account. Additionally, the fraud rules may include analysis across accounts/sub-accounts to detect patterns of illicit use implemented using multiple accounts. The fraud rules may be preconfigured or automatically generated based on algorithmically learned patterns in fraud or anomaly detection. The fraud scoring system 110 may additionally include an analyst-facilitated user interface wherein new rules can be created and issues can be manually ignored or acted upon, which functions to supplement automatic operation with human insight.

The set of fraud scores can include a wide variety of rules that use a variety of data sources. The data sources may include communication history such as involved endpoints, duration of the communication, content of the communication, frequency of the communications, geographic information of the communication, and other logged information. Some of the conditions may be based on static configuration parameters (i.e., how the account is setup). If an entity is implementing illicit behavior across multiple accounts similar resources are preferably used, and thus similarities of account settings across multiple accounts may be a sign of suspicious abnormal behavior. Other conditions may be based on usage of the account.

Another data source may include billing information such as the number of credit cards on the account, the number of accounts that use a particular credit card, number of names used on credit cards of an account, number or frequency of changes to billing information, country of IP address matched against credit card country, geographic region diversity of billing address, and other billing related information. The billing data source may be from a billing system of the communication platform. Outside data sources may additionally or alternatively be used. For example a data source with stolen or flagged credit card information can be used.

Yet another data source can include endpoints of an account. Patterns in endpoints may relate to the variety of owned or used endpoints by an account, variety of endpoints of incoming communication, variety of endpoints in outgoing communication, number or percentage of communications that are international, types of endpoints (e.g., short codes, mobile numbers, landlines, business numbers, etc.)

In the variation where the communication platform is a communication application platform, the application configuration can be another data source used in fraud rule conditions. Preferably, an application parameter is set within an account to reference the application resource (e.g., a document with the communication instructions). The application parameter is preferably a URI string that points to an application server of the account holder. The number of times the URI is used in different accounts may be the basis of a fraud rule condition. The application parameter may alternatively be a binary data file or executable code, and the raw application resource can be compared to other. For example, a cryptographic hash or fingerprint may be generated and used in comparing applications across accounts or sub-accounts. While static application configuration may be used, applications may be able to redirect application state control to other URIs and thus the fraud rule condition may be based on the URIs that are used throughout the processing of a communication session.

Similar to the fraud rules based on application configuration, media resource usage can additionally be used. If two or more accounts or sub-accounts, are using the same media resources, then those may be assumed to be operated by the same entity.

In addition to the data source, the time period in which the pattern is detected, age of the account, number of accounts, percentage of usage that is not flagged as suspicious and other qualifying conditions may provide additional context to the data source conditions.

The fraud scoring system 120 is communicatively coupled to the operational components 130 of the communication platform 100. The operational components 130 of the communication platform can include any servers, databases, processors or other resources that either define account configuration, account usage, or other aspects of the account within the platform. Preferably, the operational components include a call router that processes communication. In particular, the call router controls and facilitates the execution of a telephony application during a communication session. The various operational components 130 may additionally be used in enforcing some response to detection of illicit behavior by an account or sub-account.

2. Method for Preventing Illicit Use of a Communication Platform

Figure 2:
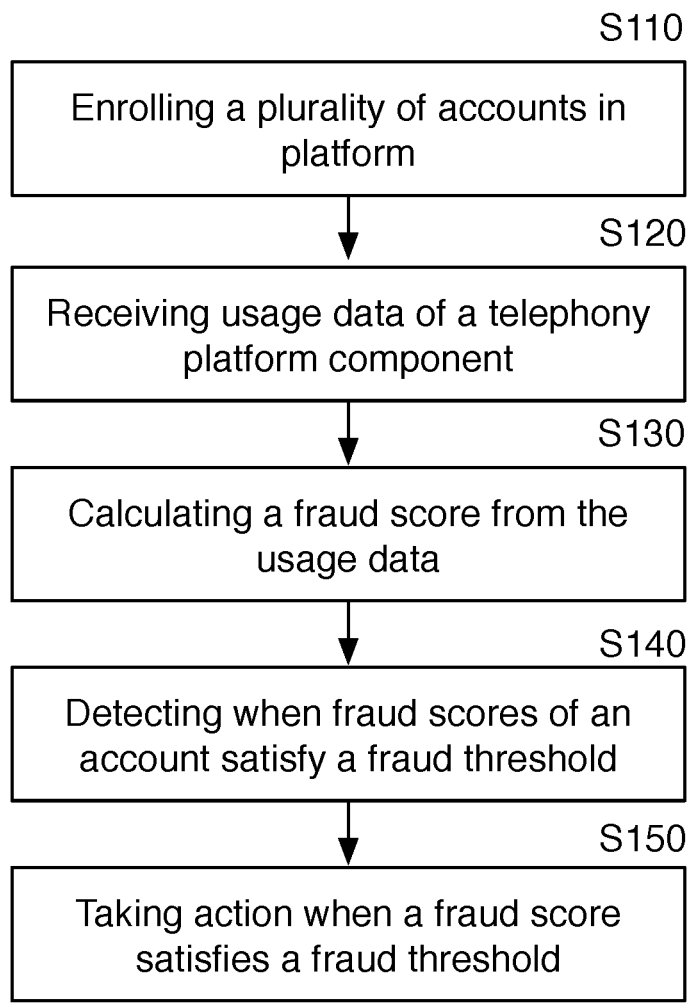
FIG. 2 is a flowchart representation of a preferred embodiment of the invention.

As shown in FIG. 2, a method for preventing illicit use of a communication platform in accordance with a preferred embodiment may include enrolling a plurality of accounts in a telecommunications platform block S110, at a fraud scoring system, receiving usage data of a telephony platform component block S120, calculating a fraud score from the usage data block S130, detecting when fraud scores of an account satisfy a fraud threshold block S140, and taking action when a fraud score satisfies a fraud threshold block S150. The method functions to enable heuristic based identification and prevention of telephony fraud. The method is preferably used to prevent illicit use cases in voice or video calls, short message service (SMS) messages, multimedia messaging service (MMS) messages, Fax, or any suitable form of telephony communication. The method can additionally be applied to IP based communication or proprietary communication channels such as SIP, Video conferencing, screen sharing or other suitable communication mediums. The method is preferably performed by a fraud scoring system which is a preferably a sub-component of telephony application platform such as the telephony platform described in U.S. patent application Ser. No. 12/417,630, filed 2 Apr. 2009 and titled "System and Method for Processing Telephony Sessions", which is incorporated in its entirety by this reference. Integration into a telephony platform preferably enables the gathering of usage data from a plurality of various telephony platform components. The telephony platform components are preferably those components that facilitate calls or messaging such as call databases or SMS databases, but may alternatively include components facilitating telephony application setup or operation such as account or credit card databases. The telephony platform is preferably a multitenant platform with multiple user accounts and optionally sub-accounts that independently use the platform. The telephony platform can be a self-sign up service, and the programmatic interface into the telephony platform can make it appear more appealing for illicit use. Entities can be freed of the hassle and complexity of arranging long-term contracts or other agreements that normally act as a barrier to telephony based fraud. The method is preferably applicable to preventing toll fraud in a telephony platform but may additionally or alternatively be used to prevent terms of service violations, denial of service attacks on a telephony platform or an outside system, suspicious behavior, credit card fraud, phishing attacks, and/or any suitable type of illicit use of a telephony platform.

The method is preferably capable of addressing internal telephony fraud (i.e., fraud performed by account holders on the telephony platform) and/or external telephony fraud (i.e., fraud attempts originating on outside systems but occurring through the telephony platform). The method is preferably capable of detecting coordinated illicit behavior performed across two or more accounts of the platform. Additionally or alternatively, the illicit behavior of a single account can additionally be addressed. The method preferably uses a heuristic based approach using rules defined in a rule set of the fraud scoring system. Rules used in the method can preferably be crafted and maintained by fraud analysts, which functions to enable analysts to use their unique insight into fraud scenarios to automatically detect future scenarios using the fraud scoring system. The method additionally can automate the detection and actions taken by fraud analysts for a system. The method may additionally include Bayesian learning, neural networks, reinforcement learning, cluster analysis or any suitable machine learning or algorithmic approaches to facilitate identifying illicit use cases. Preferably a combination of automatic fraud rule generation and fraud analyst input is used in during the method of the fraud scoring system. The method is preferably capable of identifying a wide variety of illicit use cases as defined in the rule set. When illicit use of the telephony platform is matches a rule, the fraud scoring system preferably acts to prevent that instance of illicit use from continuing.

Block S110, which includes enrolling a plurality of accounts in a telecommunications platform, functions to setup, configure, and instantiate multiple entities within the platform. An account within the telephony platform preferably has a unique identifier or uniquely identifying characteristics. Fraud detection is preferably detected within individual accounts or through two or more accounts that share usage data patterns (which often indicate a single entity is coordinating both accounts to distribute the signals of illicit behavior across multiple accounts). Enrolling an account may be initiated by a user through a user interface, but an account and/or a sub-account may alternatively be configured programmatically through an API such as a REST API of the platform. The enrollment may additionally include within one account, enrolling at least one sub-account that is managed by the first account. The sub-account (i.e., the child account) will often be an end customer of a service of the primary/parent account holder. For example, a customer care application may create a parent account, and within that account each end-customer is given a sub-account so that usage, data, and configuration can be independently managed. The parent account holder preferably manages these accounts. Sub-accounts are preferably created and managed through an API. The method can be particularly useful for systems that use sub-accounts in that, individual sub-accounts may be performing illicit behavior and the account holder may not have sufficient data when operating on top of the platform to detect the illicit behavior. The fraud detection service can be a beneficial service in promoting app developers to build on top of a platform.

Basic configuration of an account preferably occurs during enrollment but can be completed at a later time. Enrolling an account preferably includes an enrolling-account assigning at least one communication endpoint address to the account. Preferably, at least one phone number is associated with an account. Multiple phone numbers can additionally be configured. The communication endpoint may alternatively be a SIP address, email address, username, or any suitable address identifier used in routing communication to a destination. An assigned endpoint may be purchased/selected from the platform, ported from an existing system, or added to the account in any suitable manner.

The enrolling account additionally configures application resources. Preferably, an endpoint will be mapped to an application URI, which will be an external, internet-accessible resource that provides communication instructions for a communication session. Multiple application URI's may additionally be configured for different communication states or events. For example, there may be a primary application URI for incoming calls, an outgoing application URI that takes control of outgoing communication sessions, a fallback application may be used for when errors occur, there may be different application URIs for different mediums (e.g., voice, video, SMS, MMS, fax, eats.), different application URIs for different regions or originating endpoints. Each endpoint assigned to an account can additionally be uniquely configured. The configured application resources may alternatively or additionally include media files used in an application such as an application executable binary, instruction file, playable audio or video, or other suitable media resources.

The enrolling account may additionally configure billing information. The billing information will preferably include at least one credit card, but may alternatively be any suitable payment mechanism such as a bank account, links to an outside account with credit/points. The payment mechanism information will preferably include an account identifier (e.g., a credit card number), billing name, billing address. Multiple payment mechanisms may be setup.

Figure 3:
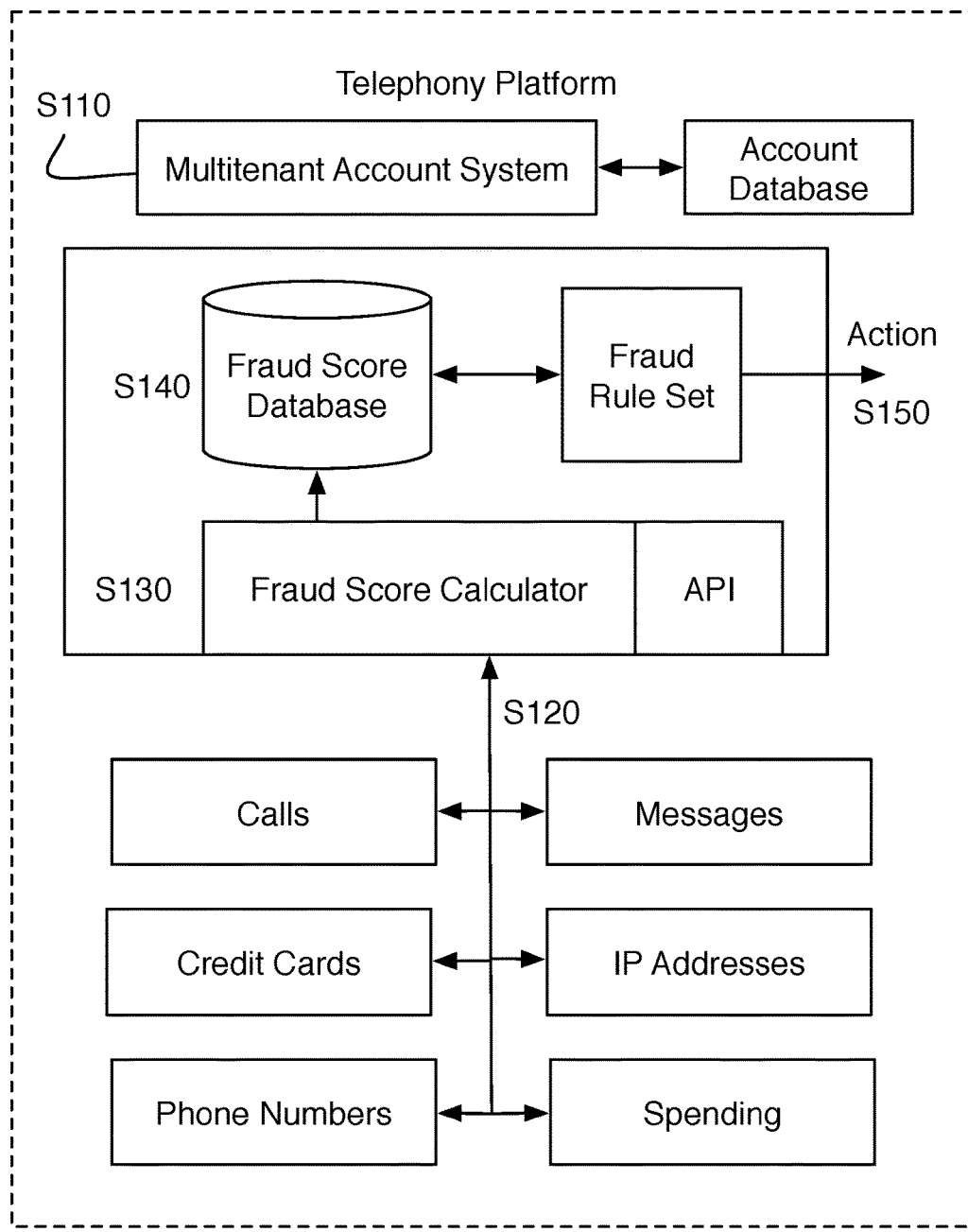
FIG. 3 is a schematic representation of a preferred embodiment of the invention.

Block S120, which recites at a fraud score system receiving usage data of a telephony platform component, functions to collect data used to calculate a fraud score. The usage data is preferably data collected and maintained independently from the fraud score system. The usage data thus typically reflects operational metrics of a telephony platform. For example, a call history database may store records of when calls where made and what the destination endpoints were for those calls. In this example, the primary purpose of the call history database may be for analytics but the data may additionally be used for calculating a fraud score. Alternatively, usage data may be collected with the explicit intent to measure data pertinent to calculating a fraud score. The fraud scoring system is preferably coupled through a network to a telephony platform component. More preferably the fraud scoring system is coupled through a network to a plurality of telephony platform components as shown in FIG. 3. A telephony platform component is preferably a machine that provides the usage data. The telephony platform components coupled to the fraud scoring system may include call history databases, messaging history databases, account databases, credit card hash databases, account databases, client device information databases, IP address databases, phone number databases, credit card or spending databases, API logs, and/or any suitable machine containing data useful for calculating a fraud score. The fraud scoring system is preferably configured to actively initiate communication with the telephony platform components, and the platform components preferably respond with any requested usage data. Alternatively, the coupled machines may independently send usage data to the fraud scoring system through a subscription or push-based service.

Figure 4:
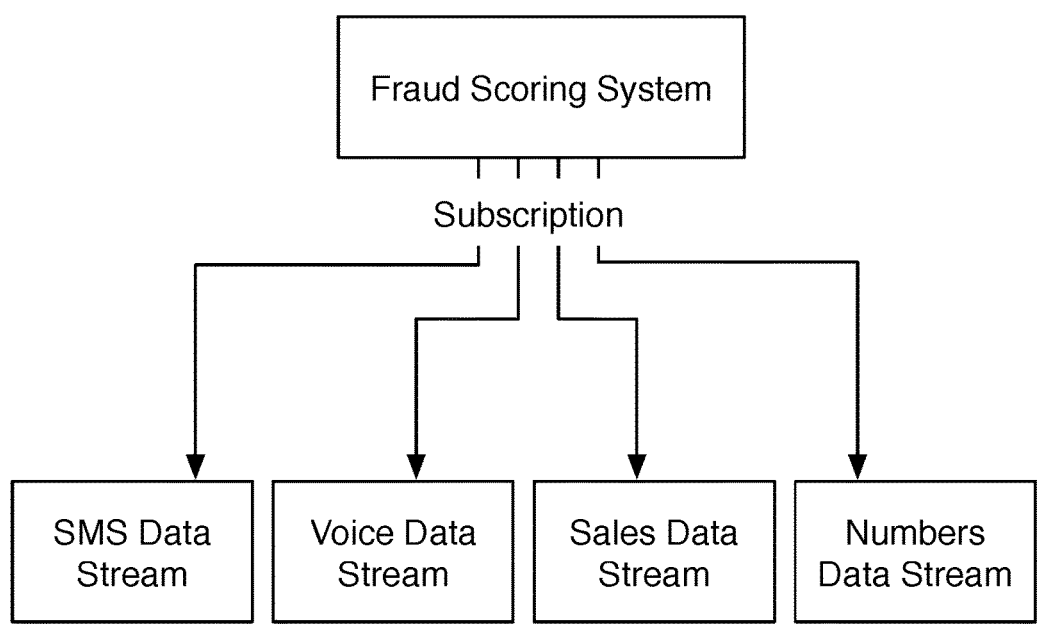
FIG. 4 is a schematic representation of a preferred embodiment of the invention for integrating a fraud scoring system with a data stream.
Figure 5:
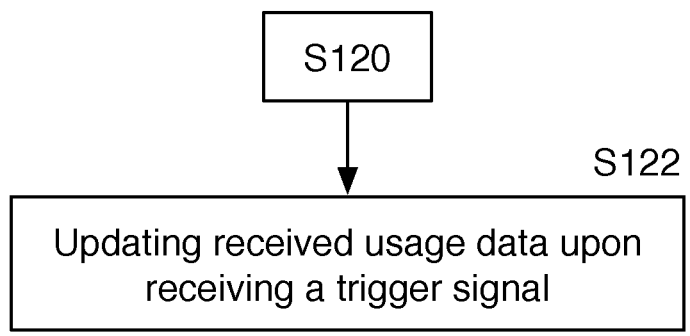
FIG. 5 is a flowchart depicting a variation of a preferred embodiment of the invention for updating received usage data upon receiving a trigger signal.
Figure 6:
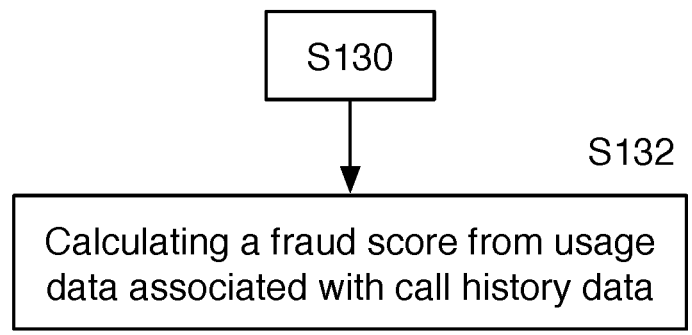
FIG. 6 is a flowchart depicting a variation of a preferred embodiment of the invention for calculating a fraud score from usage data associated with call history data.
Figure 7:
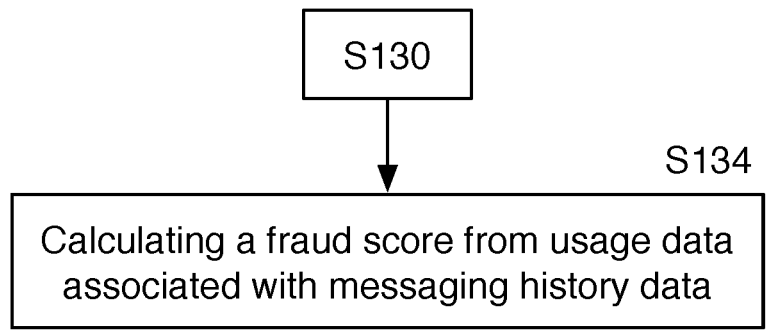
FIG. 7 is a flowchart depicting a variation of a preferred embodiment of the invention for calculating a fraud score from usage data associated with message history data.
Figure 8:
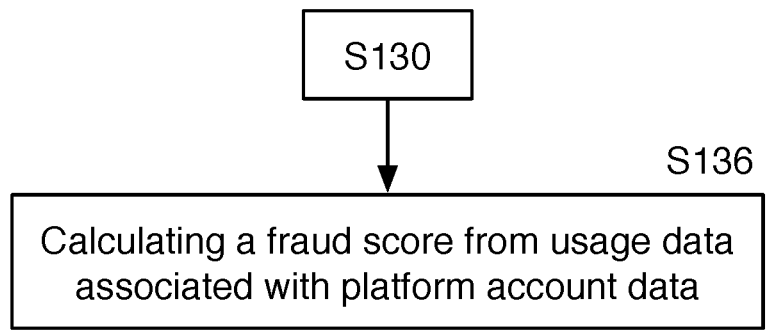
FIG. 8 is a flowchart depicting a variation of a preferred embodiment of the invention for calculating a fraud score from usage data associated with platform account data.

The fraud scoring system preferably refreshes usage data periodically. For example, fraud score system may receive new usage data from at least a subset of machines every half hour. In another variation, telephony platform components may send usage data continuously, when new data is collected, or for any suitable reason. In yet another variation, a fraud scoring system may be integrated into a data stream. In this variation data would preferably not need to be replicated or sent through a separate fraud scoring system. A fraud scoring system can preferably subscribe to designated data streams as shown in FIG. 4 but may alternatively be integrated into a data stream in any suitable manner. The fraud scoring system may additionally poll or actively request update usage data from components. Additionally or alternatively, a variation of a method of a preferred embodiment may include updating received usage data upon receiving a trigger signal Block S122 as shown in FIG. 5, which functions to enable fraud checking programmatically. In response to a trigger signal, the fraud scoring system preferably actively initiates the transmission of usage data from a telephony platform component to the fraud scoring system. The trigger signal is preferably an instruction associated with an application programming interface (API) call. The API call preferably causes usage data to be updated, a fraud score to be calculated, and action to be taken if appropriate. The API call may alternatively trigger a subset of the above steps. A telephony platform is preferably configured to send an API call to update the fraud scoring system when events occur that have a high correlation to fraud. For example, an API call to update the fraud scoring system may be sent before, while, or during updating an account, performing a credit card transaction, detecting high account concurrency, or during any suitable event. A fraud score API may additionally be used to perform other interactions with the fraud scoring system. For example, a fraud score API may trigger any suitable steps of the fraud scoring method; may create, edit, delete, or otherwise augment fraud rules, usage data, usage scores, fraud actions, or other parameters of the fraud scoring system; and/or interact with the fraud scoring system in any suitable way.

Block S130, which recites calculating a fraud score from the usage data, functions to process usage data to generate a metric that reflects the likelihood that illicit use of the telephony platform is occurring. Fraud scores are preferably calculated for a set of fraud rules. The set of fraud rules are used to calculate a set of fraud scores (e.g., measure or indicators of fraud). Additionally, fraud thresholds can define when particular types of actions are taken. A fraud rule preferably includes a usage condition, a usage data time window, and an account age condition. The fraud rules may additionally be conditions within a single account or pattern conditions across multiple accounts. The usage conditions are particular patterns in usage data (e.g., account configuration or communication history). The usage conditions are preferably particular patterns such as some threshold on the number or percentage of events or resources that would trigger activating the fraud rule (e.g., assigning the defined fraud score for that rule). The usage condition can additionally specify conditions found across multiple accounts. For example, a usage condition may be for identical/corresponding billing information configured in more than three accounts. The usage data time window is the window that is used to define what data is analyzed. Some exemplary time windows could include the past 24 hours, the past week, the past month, the past year, or across all data (e.g., no time window). The account age condition may define for how long the rule is monitored for an account. Some illicit use scenarios may only be seen with new accounts. For example, the account age condition may configure a fraud rule to apply to an account for the first week after the account is created. If the conditions of the fraud rule are satisfied a defined score is preferably assigned. These fraud scores are preferably stored per account. If the fraud rule is defined for condition patterns across multiple accounts, the fraud score is preferably assigned to each account. The fraud score is preferably a numeric value but may alternatively be a label or any suitable construct to communicate fraud likelihood. In this document we treat high fraud scores as indicating a greater likelihood of illicit use, but any suitable relationship may be defined. A fraud score is preferably associated with at least one key/identifier. The key may be an account, sub-account, an endpoint (e.g., a phone number), a credit card hash, or any suitable key. A plurality of fraud scores (e.g., one per fraud rule) is preferably calculated to monitor various entities and approaches to performing fraud in a telephony platform. For example, a series of fraud scores may be calculated to monitor accounts for one form of telephone fraud, while another series of fraud scores may be calculated to monitor credit card abuse across accounts. The fraud score is preferably indicative of activity during a specified time window, but may alternatively be an aggregate value (preferably factoring in older fraud scores to reflect multiple time windows). Calculation of fraud scores may additionally involve creating associations between subsets of the received usage data. Associations can be made based on user accounts, credit cards used to pay for accounts, endpoints or endpoint prefixes, source or destination carriers, and/or any suitable parameter that can be used to associate various data points in the usage data.

As described, fraud scores are preferably calculated to generate metrics that reflect the likelihood of fraud. These metrics may be associated with various parameters or combination of parameters of a telephony platform. Block S130 preferably includes calculating a fraud score from usage data associated with call history data Block S132, calculating a fraud score from usage data associated with messaging history data S134, and/or calculating a fraud score from usage data associated with platform account configuration data S136, but any suitable usage data may alternatively be used in calculating fraud score. Correspondingly, the block S130 preferably includes at least one fraud rule of the set of fraud rules including identifying communication-application configuration shared between at least two accounts, identifying shared patterns of media resource usage in two accounts, detecting shared billing information across two or more accounts, detecting communication history patterns across at least two accounts, and other suitable fraud rule conditions that are defined for patterns in usage data between multiple accounts.

Block S132, which recites calculating a fraud score from usage data associated with call history data, functions to create a fraud score based on patterns in calls occurring on the telephony platform. Several different parameters of a call may have been measured and included in the usage data. For example, call duration, account(s) associated with a call, call destination endpoints, caller endpoints, carrier origin of a call, destination carrier, frequency of calls, number of concurrent calls for an account, or any suitable parameter of call data. Such call related usage data can preferably be used to calculate fraud scores based on various heuristics. In one variation, high call concurrency (i.e., multiple calls occurring on the telephony platform simultaneously) for a new account is indicative of illicit use of the telephony platform. A fraud score that reflects this is preferably calculated from such data. In this variation, the fraud score preferably has a direct relationship to concurrency and an inverse relationship to the age of the account. In another variation, numerous call endpoints matching designated prefix patterns may additionally be an indicator of illicit use. A fraud score that reflects this is preferably calculated. Preferably, a fraud rule is defined for each communication history condition or set of conditions. Additionally, audio or video of a call may be used in calculating a fraud score. For example, white noise analysis of a call may be included in or extracted from usage data. White noise analysis may enable the fraud scoring system to detect if a phone call had anyone on either side of a call. In this example, a long silent phone call may be associated with illicit use of the telephony platform, and the white noise detection could be used to calculate a fraud score that reflects this heuristic.

Block S134, which recites calculating a fraud score from usage data associated with messaging history data, functions to create a fraud score based on patterns in messages occurring on the telephony platform. Messaging history data may include any data related to SMS, MMS, or other suitable messages communicated through the telephony platform. Calculation of a fraud score may include the use of usage data analogous to the usage data described above for call data, such as message endpoints, account(s) associated with a message, message frequency, message frequency as a factor of account age, carrier origin of a message, carrier destination of a message, or any suitable parameter of a message or messages sent through the telephony platform. Message content and message conversations conveyed in usage data of the messages may additionally be used to calculate a fraud score. In one variation, messages replying to account messages that instruct the sender to stop sending messages (e.g., a message with the message 'STOP') preferably contribute towards a higher fraud score. Accounts that receive a higher percentage of stop-messages are more likely to be practicing behavior that is undesirable to users. In an alternative variation, if a large number of spam-like text messages are delivered to endpoints matching a prefix and no stop-messages are received, this may also be an indicator of illicit behavior (e.g., a nefarious user may be trying to terminate as many text messages to a particular carrier).

Block S136, which recites calculating a fraud score from usage data associated with platform account configuration data, functions to use metrics collected from the telephony platform that do not directly relate to voice, video or messaging. Usage data associated with platform account configuration data may include information pertaining to user accounts, credit cards, endpoints, client devices, telephony application URI's, or any suitable platform account data. The configuration data preferably includes communication-application configuration, which includes variables and resources used in customizing and defining the application(s) of the account. One fraud rule may be defined for a condition of identifying communication-application configuration shared between at least two accounts. If multiple accounts have the same application configuration, then this can be used as a signal that the two accounts are used for the same task. Outside entities may set up multiple accounts to perform the same task to avoid detection, but identical application configuration can be a signal that the accounts are managed by the same entity or two cooperating entities. Preferably, applications are defined by application URIs that are associated with/mapped to communication endpoints. String comparisons of the URIs can be performed to identify matching applications used in multiple accounts. In some situations, some application URI's may be whitelisted so that they can be used in multiple accounts. In a similar, variation the actual application media resources consumed during execution of an application can be used to indicate similar functionality. A communication platform may transfer application state to various application URIs during a communication session. These application URIs can be similarly tracked and compared. Also media such as the instruction documents (telephony instructions in an XML document), audio files, video files, and other resources can be fingerprinted or otherwise processed to create an identifier that can be used to detect similar or identical media resources. Fingerprinting data preferably includes creating an identifier of the content of the media file. The fingerprint identifier can be preferably easily compared to other fingerprint identifiers in other accounts to determine if identical or substantially similar media is used. A fingerprint identifier preferably functions so that media can be matched despite variations in the encoding of the content. For example two images of the same picture but of slightly different dimensions and size ratios can be shown to be matching. Alternatively, the raw file may be compared. Media resource usage during communication sessions can also be used as signals of illicit behavior. For example, an image sent over MMS by one account may be fingerprinted. A second account additionally sends an image of MMS and the image is similarly fingerprinted. The fingerprint identifiers are then compared, and if they indicate the image content matches, this may trigger a fraud rule around two accounts sending identical images over MMS. Media fingerprinting can similarly be applied to audio, video and other suitable media mediums.

In one variation, calculating a fraud score from usage data associated with credit card data preferably involves comparing hashes of credit card numbers. By comparing billing information within and across accounts, the fraud scoring system functions to check diversity of payment mechanism. Payment mechanisms are preferably not shared across numerous accounts. This can be a signal that one entity is setting up multiple accounts for some reason. Within an account the payment mechanisms preferably have little diversity. If several credit cards with multiple names and addresses may be a sign that stolen credit cards are being used. As an example, a plurality of new accounts created and set up using the same credit card may be an indicator of illicit use. Credit card hash records for new accounts are preferably compared to identify credit cards used multiple times. In this variation, a credit card used multiple times for different accounts would preferably contribute to a higher fraud score. Similarly, many telephony applications allow accounts to set up an application to handle calls or messages by specifying a URI. In one variation, if one URI is configured for a plurality of new accounts, then this may indicate illicit use as it indicates one entity is setting up multiple accounts for the same purpose.

Block S140, which recites detecting when fraud scores of an account satisfy a fraud threshold, function to monitor and assess when a scenario of illicit behavior is occurring based on the fraud scores. Block S140 preferably includes storing/recording the fraud score. As described above, the fraud scores are preferably indicative of a fraud score for a particular time window, but may alternatively be an aggregate metric. The fraud scores are preferably stored such that an associated account, endpoint, application, and/or any suitable key may be referenced when retrieving data. In one variation block storing of the fraud scores is optional, and assessment can be performed directly after calculating fraud scores, without persistently storing fraud scores. Preferably, the same set of fraud rules are used in calculating fraud scores across all the accounts/sub-accounts. Fraud thresholds can define when particular types of actions are taken. In one implementation, the fraud scores associated with an account or sub-account are preferably summed, and if the total fraud score is above a define fraud score threshold a response is made in block S150. Additionally, there may be different levels of fraud thresholds. For example a fraud threshold may be defined for fraud scores from 20-50, a second fraud threshold for 51-75, and a third fraud threshold for scores over 76. These three fraud thresholds can define three levels of actions taken in block S150. The fraud reaction can alternatively be based on the fraud scores of a particular fraud rules. For example, specific fraud rules (when satisfied or for certain scores) may define a reaction of flagging an account or throttling an account, while some fraud rules may define more severe illicit behavior and can initiate automatic termination of the account.

Block S150, which recites taking action when a fraud score satisfies a fraud threshold, functions to react to fraud scores that indicate illicit behavior. The reaction to a fraud score may include flagging the account, throttling communication of an account, requesting additional billing information, notifying account holder, notifying an analyst of the communication platform, performing additional fraud detection analysis on the account, blocking particular actions on the account, or performing any suitable action. In a sub-account variation, the parent account of a sub-account is preferably notified of the sub-account illicit behavior. The notification can be an email notification, a message within the communication platform web platform, or notification made through the API of the communication platform. Account holders may have multiple sub-accounts using their service provided on top of the communication platform. By performing the fraud regulation by sub-accounts, the communication platform can avoid taking action against the account itself since many sub-accounts may be using the communication platform in a proper manner. This functions to simplify and abstract the fraud prevention aspect away from account holders such that the communication platform can handle illicit use detection. A fraud scoring system preferably includes a set of fraud rules (i.e., a rule set) stored using any suitable schema. The rule set preferably enables various heuristics to be configured and/or updated to keep current with the latest fraud attempts. Fraud score patterns may include thresholds for a particular fraud score or alternatively a group of fraud scores. Some exemplary fraud score patterns may include taking action when there are more than a specified number of international calls lasting longer than a specified amount of time, when an average length of international calls is greater than a specified amount of time, when greater than a specified number of outbound SMS messages to a classification of prefixes (e.g., UK prefixes) are made, when more than a specified number of unique credit cards are added to an account, when the credit cards of an account use more than a specified number of zip codes, when one credit card is used on more than a specified number of accounts, when one IP address is used across more than a specified number of accounts, when the account balance is more than a specified amount for an account and the age of the account is less than a specified number of days, when the answer rate of outbound calls is less than a specified percentage and/or when any suitable pattern is satisfied, As shown in FIG. 9, rule sets may be dependent on measured metrics in combination with a threshold, time period for the metrics, and account age. Alternatively, any suitable parameters may be specified to determine a rule set. Fraud score patterns may alternatively be trending patterns from a time series of related fraud scores. Fraud reactions preferably include suspending an account, blacklisting credit card numbers, blacklisting application URI's or IP's, rate-limiting services provided to an offending account, remove or adjust services provided to an offending account (e.g., remove international services), flag the account for a human fraud analyst to investigate, and/or any suitable course of action. The fraud reaction is preferably signaled to the telephony platform, and the resulting reaction preferably alters behavior of the telephony platform to prevent a suspected case of illicit use of the platform. There may additionally be different level of responses based on the severity of the fraud score, and fraud reactions may be applied in stages if the fraud score does not subside.

Figure 10:
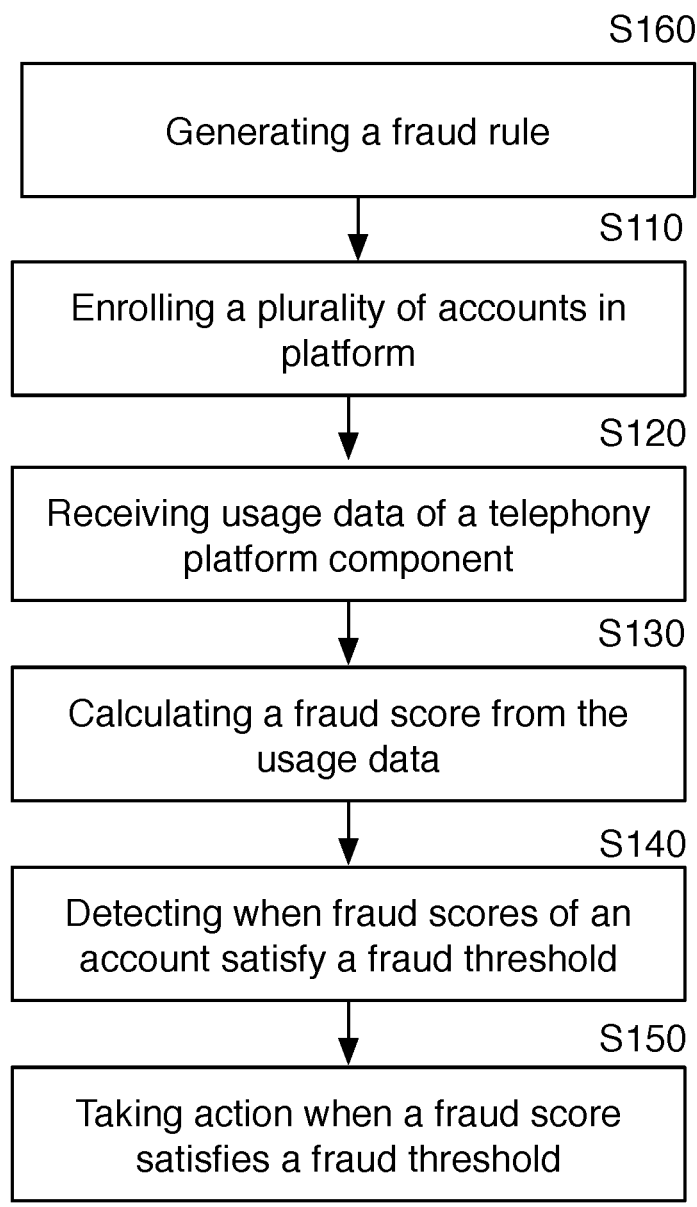
FIG. 10 is a flowchart depicting a variation of a preferred embodiment of the invention for generating a fraud rule.

Additionally or alternatively, a method of a preferred embodiment may include generating a fraud rule block S160 as shown in FIG. 10, which functions to produce a fraud score based on collected data. In one variation, a fraud score set is preferably predominately generated by fraud analysts. This preferably enables fraud analysts to apply unique insight into fraud attempts to enable automatic detection. In a variation that implements block S150, at least a subset of the fraud rule set is generated through analysis of the data. As mention above Bayesian learning, neural networks, reinforcement learning, cluster analysis or any suitable machine learning techniques may be used to extract rules to identify fraud scenarios. The generating of a fraud rule may be active or reactive. Active generation of a fraud rule will preferably automatically generate a rule based on observed data. Reactive fraud rule generation preferably generates a fraud rule after a fraud scenario has happened. Data from the time of the fraud can preferably be replayed such that a fraud rule may be generated that would have set the fraud score to reflect the occurrence of the fraud scenario.

An alternative embodiment preferably implements the above methods in a computer-readable medium storing computer-readable instructions. The instructions are preferably executed by computer-executable components preferably integrated with a fraud scoring system. The fraud scoring system preferably includes a fraud rule set and a fraud scoring API. The fraud scoring system is preferably integrated into a telephony platform capable of facilitating voice, video, or message communication. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
    calculating, based on sub-account usage data of at least a first sub-account and a second sub-account managed by a parent account of a communication platform, a fraud score for the first sub-account, the sub-account usage data including at least sub-account configuration data and communication history data, wherein calculating the fraud score comprises:
        generating a first fingerprint from a first image transmitted using the first sub-account;
        generating a second fingerprint from a second image transmitted using the second sub-account;
        calculating the fraud score at least partially based on a comparison of the first fingerprint and the second fingerprint, the comparison of the first fingerprint and the second fingerprint to determine a similarity between the first image and the second image;
    in response to determining that the fraud score satisfies a threshold, providing an external service provider system of the parent account with a notification of illicit behavior of the first sub-account.

2. The method of claim 1, wherein the first sub-account is an account of an external system that uses a service of the external service provider system and a service of the communication platform.

3. The method of claim 1, wherein calculating the fraud score further comprises:
    determining a first hash value based on first payment data associated with the first sub-account;
    determining a second hash value based on second payment data associated with the second sub-account; and
    calculating the fraud score at least partially based on a comparison of the first hash value and the second hash value, the comparison of the first hash value and the second hash value to determine a similarity between the first payment data matches the second payment data.

4. The method of claim 1, wherein calculating the fraud score further comprises:
    calculating the fraud score at least partially based on a similarity between first account configurations of the first sub-account and second account configurations of the second sub-account.

5. The method of claim 1, wherein calculating the fraud score further comprises:
    calculating the fraud score at least partially based on a similarity between a first Uniform Resource Identifier (URI) designated for use by the first sub-account and a second URI designated for use by the second sub-account.

6. The method of claim 1, further comprising:
restricting at least one type of communications from being initiated by the first sub-account in response to determining that the fraud score satisfies the threshold.

7. The method of claim 1, further comprising:
notifying an analyst of the communication platform of the illicit behavior of the first sub-account.

8. A system comprising:
one or more computer processors; and
one or more computer-readable mediums storing instructions that, when executed by the one or more computer processors, cause the system to perform operations comprising:
calculating, based on sub-account usage data of at least a first sub-account and a second sub-account managed by a parent account of a communication platform, a fraud score for the first sub-account, the sub-account usage data including at least sub-account configuration data and communication history data, wherein calculating the fraud score comprises:
generating a first fingerprint from a first image transmitted using the first sub-account;
generating a second fingerprint from a second image transmitted using the second sub-account;
calculating the fraud score at least partially based on a comparison of the first fingerprint and the second fingerprint, the comparison of the first fingerprint and the second fingerprint to determine a similarity between the first image and the second image;
in response to determining that the fraud score satisfies a threshold, providing an external service provider system of the parent account with a notification of illicit behavior of the first sub-account.

9. The system of claim 8, wherein the first sub-account is an account of an external system that uses a service of the external service provider system and a service of the communication platform.

10. The system of claim 8, wherein calculating the fraud score further comprises:
determining a first hash value based on first payment data associated with the first sub-account;
determining a second hash value based on second payment data associated with the second sub-account; and
calculating the fraud score at least partially based on a comparison of the first hash value and the second hash value, the comparison of the first hash value and the second hash value to determine a similarity between the first payment data matches the second payment data.

11. The system of claim 8, wherein calculating the fraud score further comprises:
calculating the fraud score at least partially based on a similarity between first account configurations of the first sub-account and second account configurations of the second sub-account.

12. The system of claim 8, wherein calculating the fraud score further comprises:
calculating the fraud score at least partially based on a similarity between a first Uniform Resource Identifier (URI) designated for use by the first sub-account and a second URI designated for use by the second sub-account.

13. The system of claim 8, the operations further comprising:
restricting at least one type of communications from being initiated by the first sub-account in response to determining that the fraud score satisfies the threshold.

14. The system of claim 8, the operations further comprising:
notifying an analyst of the communication platform of the illicit behavior of the first sub-account.

15. A non-transitory computer-readable medium storing instructions that, when executed by one or more computer processors of a computing device, cause the computing device to perform operations comprising:
calculating, based on sub-account usage data of at least a first sub-account and a second sub-account managed by a parent account of a communication platform, a fraud score for the first sub-account, the sub-account usage data including at least sub-account configuration data and communication history data, wherein calculating the fraud score comprises:
generating a first fingerprint from a first image transmitted using the first sub-account;
generating a second fingerprint from a second image transmitted using the second sub-account;
calculating the fraud score at least partially based on a comparison of the first fingerprint and the second fingerprint, the comparison of the first fingerprint and the second fingerprint to determine a similarity between the first image and the second image;
in response to determining that the fraud score satisfies a threshold, providing an external service provider system of the parent account with a notification of illicit behavior of the first sub-count.

16. The non-transitory computer-readable medium of claim 15, wherein the first sub-account is an account of an external system that uses a service of the external service provider system and a service of the communication platform.

17. The non-transitory computer-readable medium of claim 15, wherein calculating the fraud score further comprises:
determining a first hash value based on first payment data associated with the first sub-account;
determining a second hash value based on second payment data associated with the second sub-account; and
calculating the fraud score at least partially based on a comparison of the first hash value and the second hash value, the comparison of the first hash value and the second hash value to determine a similarity between the first payment data matches the second payment data.

18. The non-transitory computer-readable medium of claim 15, wherein calculating the fraud score further comprises:
calculating the fraud score at least partially based on a similarity between first account configurations of the first sub-account and second account configurations of the second sub-account.

19. The non-transitory computer-readable medium of claim 15, wherein calculating the fraud score further comprises:
calculating the fraud score at least partially based on a similarity between a first Uniform Resource Identifier (URI) designated for use by the first sub-account and a second URI designated for use by the second sub-account.

20. The non-transitory computer-readable medium of claim 15, the operations further comprising:

restricting at least one type of communications from being initiated by the first sub-account in response to determining that the fraud score satisfies the threshold.

* * * * *

UNITED STATES PATENT AND TRADEMARK OFFICE
CERTIFICATE OF CORRECTION

PATENT NO. : 10,469,670 B2
APPLICATION NO. : 15/911737
DATED : November 5, 2019
INVENTOR(S) : Ballai et al.

It is certified that error appears in the above-identified patent and that said Letters Patent is hereby corrected as shown below:

On the Title Page

In item (60), in "Related U.S. Application Data", in Column 1, Line 1, delete "(60)" and insert --(63)-- therefor In the Claims In Column 16, Line 32, in Claim 15, delete "sub-count" and insert --sub-account-- therefor Signed and Sealed this
Nineteenth Day of January, 2021

Andrei Iancu
*Director of the United States Patent and Trademark Office*